(12) United States Patent
Gazzola et al.

(10) Patent No.: US 8,457,490 B2
(45) Date of Patent: Jun. 4, 2013

(54) USE OF SUBCARRIER DEACTIVATION IN A MULTI-SUBCARRIER CHANNEL TO IMPROVE REACH IN AN OPTICAL NETWORK

(75) Inventors: Maurizio Gazzola, Milan (IT); Stefano Piciaccia, Milan (IT); Lorenzo Ghioni, Casalmaiocco (IT)

(73) Assignee: Cisco Technology, Inc., San Jose, CA (US)

( * ) Notice: Subject to any disclaimer, the term of this patent is extended or adjusted under 35 U.S.C. 154(b) by 524 days.

(21) Appl. No.: 12/732,676

(22) Filed: Mar. 26, 2010

(65) Prior Publication Data
US 2011/0236013 A1    Sep. 29, 2011

(51) Int. Cl.
*H04J 14/00* (2006.01)

(52) U.S. Cl.
USPC .......... 398/49; 398/57; 398/79; 398/5; 398/7; 398/68

(58) Field of Classification Search
USPC ............... 398/49, 57, 58, 66, 1–8, 14, 12, 19, 398/33, 34, 68, 79
See application file for complete search history.

(56) References Cited

U.S. PATENT DOCUMENTS

| | | | |
|---|---|---|---|
| 5,956,165 A * | 9/1999 | Fee et al. | 398/78 |
| 6,714,517 B1 | 3/2004 | Fawaz et al. | |
| 7,031,612 B2 | 4/2006 | Liou et al. | |
| 7,110,668 B2 | 9/2006 | Gerstel et al. | |
| 2003/0072052 A1 * | 4/2003 | Graves et al. | 359/124 |
| 2007/0071447 A1 | 3/2007 | Ozaki et al. | |
| 2009/0162060 A1 * | 6/2009 | Vasseur et al. | 398/49 |
| 2010/0021162 A1 | 1/2010 | Strasser et al. | |

FOREIGN PATENT DOCUMENTS

EP    1610484 A1    12/2005

OTHER PUBLICATIONS

International Search Report and Written Opinion in Counterpart International Application No. PCT/US2011/029804, mailed May 20, 2011.

* cited by examiner

Primary Examiner — M. R. Sedighian

(57) ABSTRACT

Various example embodiments are disclosed. According to an example embodiment, a method may include determining that a transmission of a data signal over a path of a wavelength division multiplexed (WDM) optical network using a group of optical subcarriers is not optically feasible; determining that the transmission of the data signal over the path using a subset of the group of optical subcarriers is optically feasible; activating subcarriers for the subset of optical carriers while deactivating one or more optical subcarriers of the group, at least one deactivated subcarrier provided between at least two activated subcarriers of the group; and transmitting the data signal over at least a portion of the path using the activated subcarriers of the group.

22 Claims, 10 Drawing Sheets

US 8,457,490 B2

USE OF SUBCARRIER DEACTIVATION IN A MULTI-SUBCARRIER CHANNEL TO IMPROVE REACH IN AN OPTICAL NETWORK

TECHNICAL FIELD

The present disclosure relates generally to optical networks.

BACKGROUND

Dense wavelength division multiplexed (DWDM) optical networks are optical networks in which optical signals at different wavelengths may be transmitted over a common or shared optical fiber. Each wavelength may be considered an optical channel. MPLS (MultiProtocol Label Switching) and GMPLS (Generalized MultiProtocol Label Switching) may be used to determine a path (or route) through a network, and then allocate resources for the path, in a distributed manner, such as through a distributed control plane. Electronic control plane technologies do not typically consider the optical impairments nor determine the optical feasibility of optical paths.

An optical signal should be received at a destination node with at least a minimum required OSNR (optical signal to noise ratio). In some cases, optical impairments, such as non-linear effects (NLE), noise, attenuation, and the like, may be introduced by optical components along an optical path which may reduce the signal strength or OSNR below the required level.

DESCRIPTION OF EXAMPLE EMBODIMENTS

Overview

Figure 1:
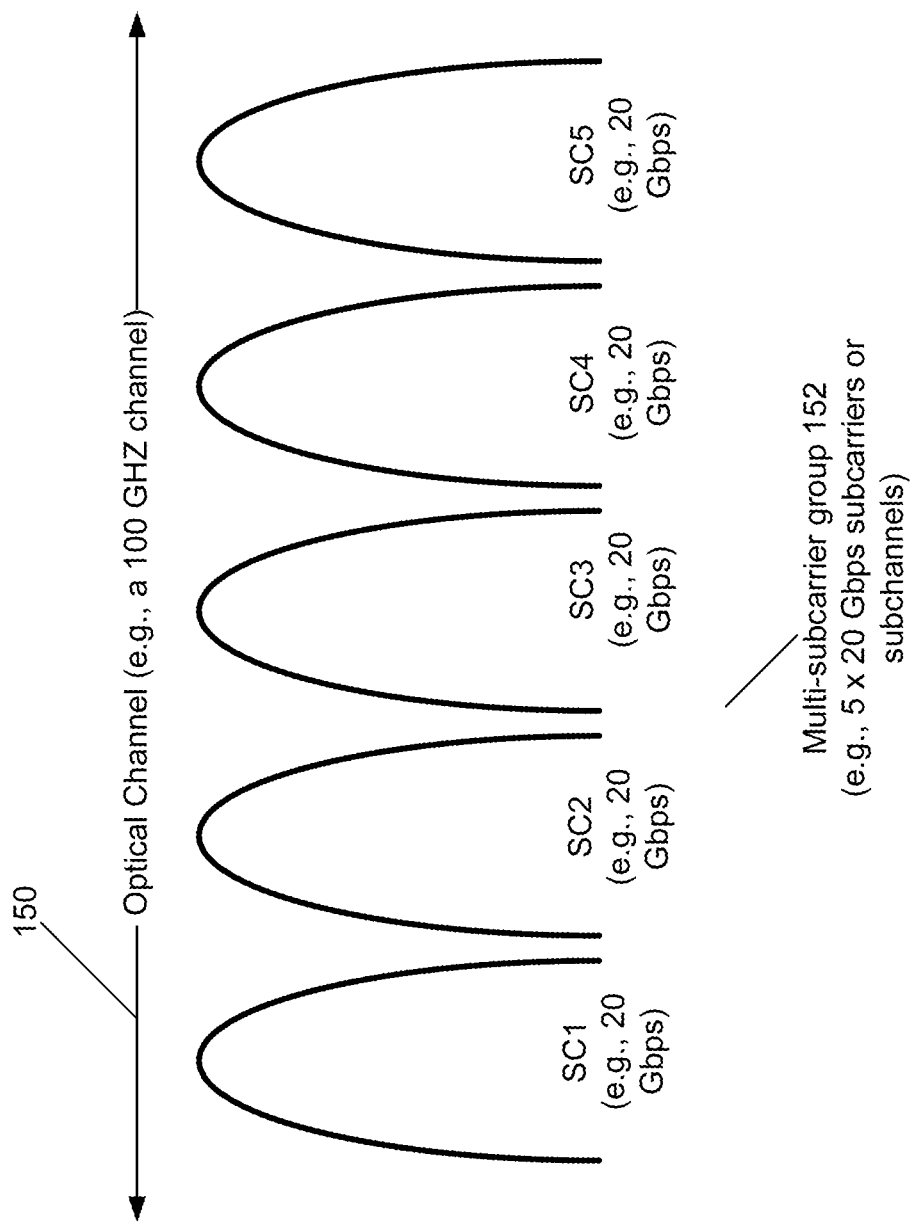
FIG. 1 is a diagram illustrating the transmission of a signal over a channel using a group of carriers or subcarriers.

According to an example embodiment, a method may include transmitting a data signal over a path of a WDM optical network via a group of optical subcarriers of an optical channel; determining that a hop-to-hop route for the path has been changed or rerouted; determining that the transmission of the data signal over the rerouted path using the group of optical subcarriers is not optically feasible; determining that the transmission of the data signal over the rerouted path using a subset of the group of optical subcarriers is optically feasible; and, transmitting the data signal over the rerouted path of the WDM network using the subset of the group of subcarriers, with a remaining portion of the group of subcarriers being inactive or not used for transmission of the data signal, with at least one inactive subcarrier provided between two active subcarriers within the subset of the group of optical subcarriers.

According to another example embodiment, an apparatus may include a transponder including a plurality of lasers including at least one laser for each of a plurality of subcarriers of a group of optical subcarriers; at least one processor; and at least one memory including computer program code, the computer program code, when executed by the processor, configured to cause the apparatus to: activate the plurality of lasers to transmit a data signal over a path of a WDM optical network via the group of optical subcarriers; determine that a hop-to-hop route for the path has been changed or rerouted; determine that the transmission of the data signal over the rerouted path using the group of optical subcarriers is not optically feasible; determine that the transmission of the data signal over the rerouted path using a subset of the group of optical subcarriers is optically feasible; and deactivate one or more of the plurality of lasers, to cause one or more of the subcarriers of the group of optical subcarriers to be inactive and allow the subset of the group of optical subcarriers to remain active, and to transmit the data signal over the rerouted path of the WDM network using the subset of the group of optical subcarriers via the activated lasers, with at least one inactive subcarrier provided between two active subcarriers within the subset.

According to another example embodiment, a method may include determining that a transmission of a data signal over a path of a wavelength division multiplexed (WDM) optical network using a group of optical subcarriers is not optically feasible; determining that the transmission of the data signal over the path using a subset of the group of optical subcarriers is optically feasible; activating subcarriers for the subset of optical carriers while deactivating one or more optical subcarriers of the group, at least one deactivated subcarrier provided between at least two activated subcarriers of the group; and transmitting the data signal over at least a portion of the path using the activated subcarriers of the group.

According to another example embodiment, an apparatus may include a plurality of lasers including at least one laser for each of a plurality of subcarriers of a group of optical subcarriers; at least one processor; and at least one memory including computer program code, the computer program code, when executed by the processor, configured to cause the apparatus to: determine that a transmission of a data signal over a path of a wavelength division multiplexed (WDM) optical network using a group of optical subcarriers is not optically feasible; determine that the transmission of the data signal over the path using a subset of the group of optical subcarriers is optically feasible; activate subcarriers for the subset of optical carriers while deactivating one or more optical subcarriers of the group, at least one deactivated subcarrier provided between at least two activated subcarriers of the group; and transmit the data signal over at least a portion of the path using the activated subcarriers of the group.

Description

FIG. 1 is a diagram illustrating the transmission of a signal over a channel using a group of carriers or subcarriers.

According to an example embodiment, a data signal may be transmitted over an optical network (e.g., DWDM network) using a plurality (or group) of carriers or subcarriers. The group or plurality of carriers/subcarriers may be referred to, for example, as a multi-carrier (or multi-subcarrier) group, which may use a group or plurality of smaller bandwidth carriers or subcarriers provided within a larger bandwidth channel. The term carrier or subcarrier may be used interchangeably in this case, since a group of subcarriers/carriers are used as a group to transmit a data signal.

As shown in FIG. 1, multi-subcarrier group 152 may include one optical channel 150, which may be, for example an ITU-T channel of 100 GHz. This is merely an example, and the channel 150 may be any size or width. A data signal may be transmitted via a group or plurality of optical subcarriers within the channel 150, including, for example, subcarriers SC1, SC2, SC3, SC4 and SC5. For example, each of the subcarriers SC1-SC5 may accommodate a 20 Gbps signal, and thus, may accommodate 100 Gbps as a group, for example.

An optical signal should have sufficient OSNR (optical signal to noise ratio, also referred to sometimes as SINR or signal to interference and noise ratio, or similar measurements) at a receiving or destination optical node to ensure that the data can be recovered from the received optical signal (optical feasibility). Unfortunately, a number of optical impairments may typically reduce the optical signal strength and/or introduce signal distortion or noise, thereby reducing the OSNR (or SINR) of the optical signal at the destination. For example, optical fiber and optical components such as optical amplifiers may attenuate the optical signal along a path. A longer optical path (longer optical fiber and more components) may typically cause greater signal attenuation and noise, and thus, result in a lower OSNR at the destination. At some point, the optical signal may not be optically feasible along a specific optical path (e.g., optical signal not recoverable at the optical destination), for a given set of optical subcarriers, which may mean that, for example, the OSNR of the received optical signal at the destination node (e.g., within an optical network or DWDM network) is less than the receiver sensitivity (or less than the minimum required OSNR for the optical node or receiver).

Non-linear effects (NLE) may also decrease the OSNR of an optical signal. Four wave mixing is one type of NLE. Four-wave mixing may be described as an intermodulation distortion in optical systems, and may be similar to the third-order intercept point in electrical systems. Four wave mixing may occur, for example, due to the interaction of three signals in a non-linear medium (such as an optical fiber) to produce a (unintended) fourth signal. For example, at least in some cases, four wave mixing may occur when transmitting signals on (or via) a multi-subcarrier (or multi-carrier) group, such as via multi-subcarrier group 152. Four wave mixing is merely one example of NLE or optical impairments, and the various embodiments are not limited to the use of 3 or more subcarriers, as less than 3 subcarriers and more than 3 subcarriers may be used. Thus, while using multiple subcarriers or carriers within a multi-subcarrier group 152 may provide increased data rate (e.g., 5×20 Gbps), the transmission of data via this group of subcarriers may also increase NLE due to four wave mixing, which may decrease the OSNR of the received signal(s). Thus, for certain paths through an optical network, the use of a group of optical subcarriers (multi-subcarrier group) may not be optically feasible (e.g., received OSNR may be less than the required minimum OSNR) due to optical impairments along the path, e.g., such as attenuation, noise and NLE (such as four wave mixing as an example).

Figure 2:
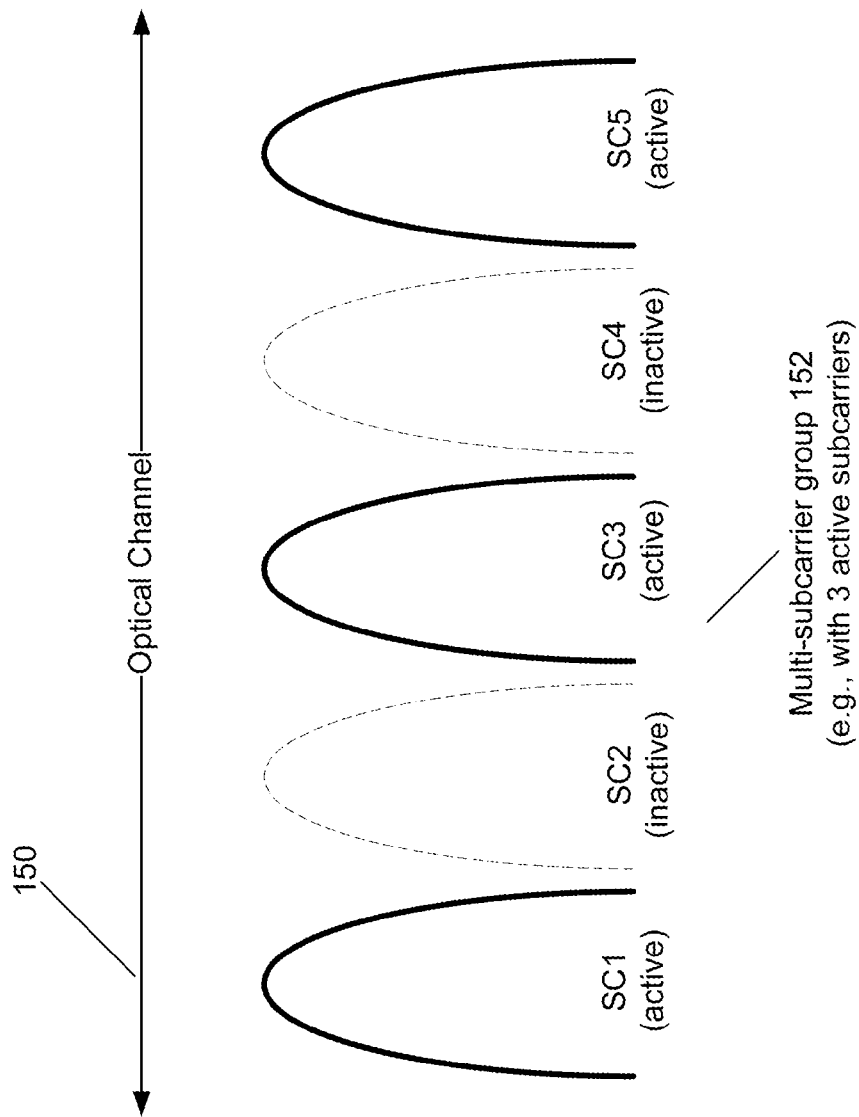
FIG. 2 is a diagram illustrating the transmission of a signal using a subset of a group of subcarriers according to an example embodiment.

According to an example embodiment, instead of using all of the subcarriers within a group of subcarriers (e.g., all subcarriers of a multi-subcarrier group) to transmit a signal across an optical network, the signal may be transmitted using a subset of the multi-subcarrier group in order to decrease NLE/four wave mixing and thereby increase optical reach of the signal (e.g., allowing the signal to travel a longer distance due to less NLE/impairment, as compared to using all of the subcarriers in the multi-subcarrier group). FIG. 2 is a diagram illustrating the transmission of a signal using a subset of a group of subcarriers according to an example embodiment. In this example, rather than transmitting a signal via all five subcarriers (SC1, SC2, SC3, SC4, and SC5) of the multi-subcarrier group 152, the data signal is transmitted via only subcarriers SC1, SC3 and SC5. Thus, in this example, subcarriers SC1, SC3 and SC5 are active, while subcarriers SC2 and SC4 are inactive (or deactivated) in which no signal is transmitted via SC2 and SC4.

According to an example embodiment, at least one inactive subcarrier may be provided between two active subcarriers of a multi-subcarrier group, e.g., which may decrease NLE (such as four wave mixing) or other optical impairment. For example, an inactive subcarrier SC2 may be provided between active subcarriers SC1 and SC3, or an inactive subcarrier SC4 may be provided between active subcarriers SC3 and SC5. This is merely an example, and any combination of subcarriers may be active, while providing at least one inactive subcarrier within the multi-subcarrier group 152. In this manner, by providing at least one inactive subcarrier between two active subcarriers of a multi-subcarrier group, NLE (or other optical impairment) may (at least in some cases) be decreased, which may improve or increase the received OSNR at the destination optical node. Therefore, this improved OSNR may allow the reach of the optical signal in an optical network to be improved or increased, at the cost of a lower (or decreased) data rate.

For example, a 100 Gbps signal may be provided by all 5 subcarriers (SC1-SC5) of the multi-subcarrier group 152 in FIG. 1, but use of all 5 subcarriers in the group may not be optically feasible for longer paths, e.g., due to NLE or four wave mixing (or other optical impairments) of these 5 optical subcarriers. NLE and/or four wave mixing are only examples of optical impairments, and the disclosure is not limited thereto. In this example, a longer optical reach may be obtained (at least in some cases) for a data signal by using only three active subcarriers for multi-subcarrier group 152, and having two inactive subcarriers, which may provide a data rate of 60 Gbps (3×20 Gbps). Providing an inactive subcarrier between two active optical subcarriers of the multi-subcarrier group may (at least in some cases) decrease some optical impairments, such as NLE or four wave mixing, thereby increasing SNR and optical reach (e.g., distance that the signal may be transmitted and be optically feasible) for the signal. Other combinations of optical subcarriers may be used as well (e.g., using SC1 and SC3, or SC2 and SC4, or SC1 and SC4, or SC1 and SC5, or SC2 and SC5), while still improving OSNR and optical reach for the signal. Optical reach of a signal may be increased when the OSNR has been improved or increased since the signal may withstand greater attenuation or impairment (e.g., across network greater distances) while still providing the required OSNR at the destination. However, using fewer subcarriers (less than all of the subcarriers of the multi-subcarrier group) may result in a lower data rate. Thus, in an example embodiment, for some optical paths, it may be useful to deactivate one or more of the carriers/subcarriers within the multi-subcarrier group to improve the reach of the data signal through the optical (e.g., DWDM) network.

Figure 3:
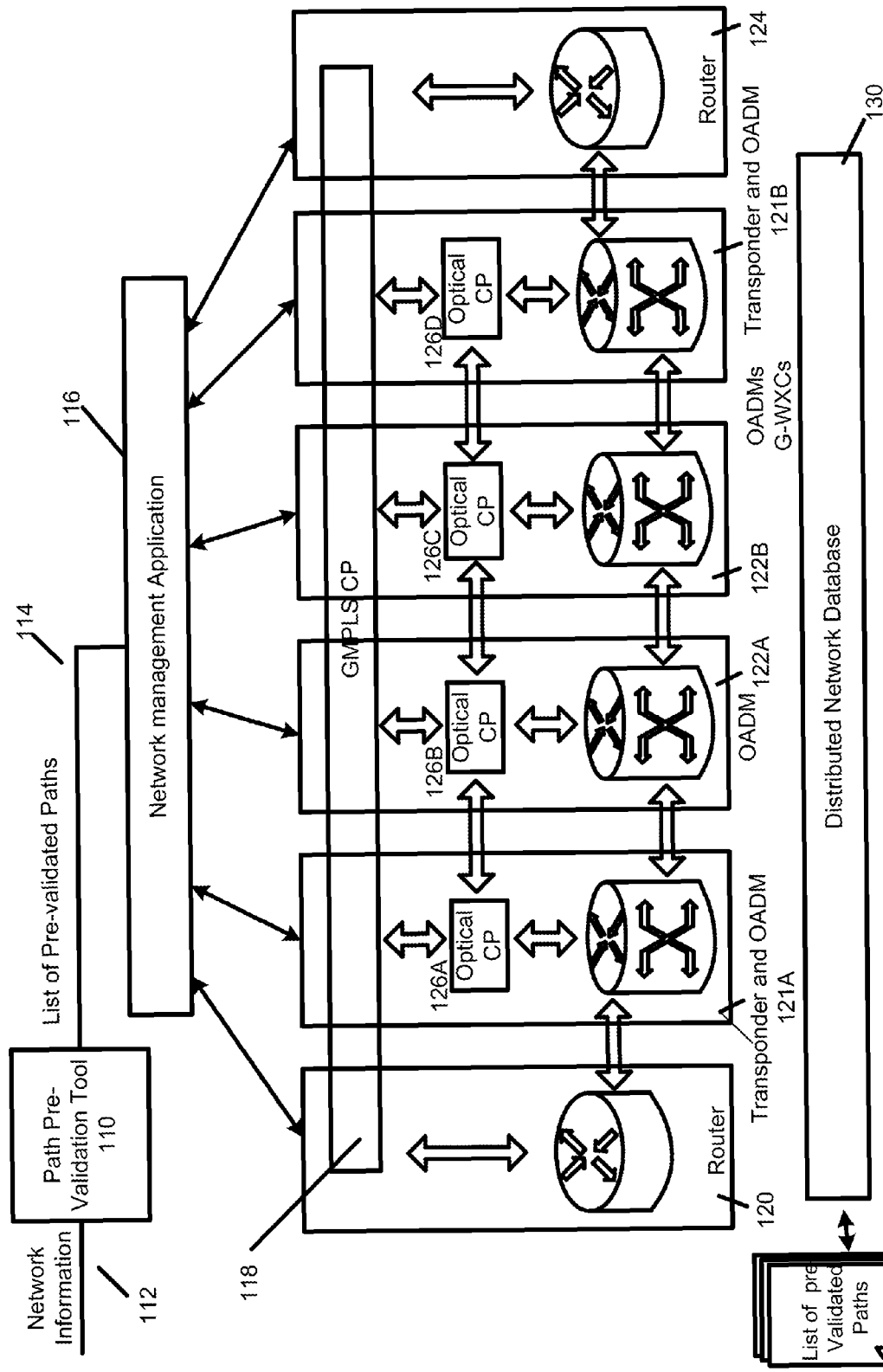
FIG. 3 is a block diagram illustrating a WDM optical network according to an example embodiment.

FIG. 3 is a block diagram illustrating a WDM optical network 100 according to an example embodiment. The WDM optical network 100 may be, for example, a DWDM optical network. Optical network 100 may include a number of nodes including routers 120 and 124 that perform routing functions, e.g., routing or forwarding of packets or data to one of a plurality of output ports based on a routing algorithm. Optical network 100 may also include optical nodes 121 and 122 (including optical nodes 121A, 121B, 122A, and 122B). An optical fiber (or fibers) may be provided between each router and adjacent optical node 121, 122, and between adjacent optical nodes 121/122. For example, there may be two fibers between adjacent nodes for bidirectional communication, e.g., a first optical fiber for transmitting optical signals from a node and a second fiber for receiving optical signals at the node.

Optical nodes 122 may include, for example, Optical Add/Drop Multiplexers (OADMs) which may add optical signals, or may drop one or more optical signals before forwarding the optical signal via an optical fiber. Only two optical nodes 122 (including 122A and 122B) are shown, but any number may be provided. The OADMs may be, for example, reconfigurable OADMS or ROADMs. Optical nodes 122 may provide entry (add) and exit (drop) points to the network for signals. This is merely an example network 100, and any number of routers, and optical nodes (e.g., OADMs) may be provided, and may be provided in a number of different configurations.

Optical nodes 121 (including optical nodes 121A and 121B) may be (or may include) an optical transponder for modulating data onto one or more optical subcarriers for transmission over an optical fiber, and for receiving and demodulating data received via one or more optical subcarriers. The optical transponder may also include a client interface for interfacing with an adjacent router 120 or 124. Optical nodes 121 (121A and 121B) may also include an OADM.

Each node 121, 122 may include an electronic control plane device, and these electronic control plane devices collectively may provide a GMPLS control plane (GMPLS CP) 118. The GMPLS CP 118, for example, may determine paths and may route messages, via GMPLS, through the network 100, but does not necessarily take into account any optical impairments along the path, such as optical impairments introduced by components along a potential path, such as noise, attenuation, NLE (such as NLE due to four way mixing), etc. Each optical node 121 and 122 may include an optical control plane (OCP) control device 126. For example, optical nodes 121A, 121B, 122A, and 122B, may include OCP control devices 126A, 126B, 126C and 126D, respectively. The GMPLS CP control device (part of 118) and the OCP control device 126 may be provided as software executed by a processor at each optical node.

In an example embodiment, an ingress optical node, e.g., optical node 121A may receive a request for bandwidth/resources across optical network 100, between a source node and a destination node. This may require the optical nodes of network 100 to: determine a path and route: determine that the path/route is optically feasible for one or more sets of optical resources (e.g., ports and/or one or more optical carriers/subcarriers); and, allocate or reserve resources along the path.

In an example embodiment, the GMPLS control devices 118 (at one or more nodes of network 100) may determine a path (including source and destination), and a specific hop to hop route from source to destination, e.g., based on an exchange of OSPF (Open Shortest Path First) messages between nodes that allow the nodes and routers to learn the other nodes and topology of the network, for example.

In one example embodiment, OCP control devices 126 may determine the optical feasibility (e.g., in a distributed manner) of one or more paths/routes through network 100, e.g., from a source node to a destination node, in response to the request for bandwidth. For example, a path may be defined by a source and destination node, and the route between these two points may be the specific hop-to-hop route. If optical feasibility is determined to be negative (path/route is not optically feasible for a specific set of optical resources), then the OCP control device may generate an error message that is sent to one or more other OCP control devices (including the OCP control device of the ingress optical node/transponder 121A), and requests the electronic control plane to determine a new path or route (or new route between the source node and destination node), or to calculate optical feasibility for this same route but for a different set of optical resources (e.g., different set of optical subcarriers). If the new path (or new route between source node and destination node and/or new set of optical resources) is determined to be optically feasible, the optical nodes may then allocate or reserve the identified resources for the path/route.

For example, one or more OCP control devices 126 may receive network information, which may be stored in a distributed network database 130, e.g., where a copy (full or partial copy) of the network information may be stored in memory at each optical node 122, for example. This network information may include a network configuration (or network topology) and optical parametric information for elements (e.g., optical splitters, OADMs, optical amplifiers, optical fibers) in the network 100, e.g. The optical parametric information may include any information that may describe operation of the elements, such as the increase or decrease in power (such as optical signal attenuation) introduced by an element, optical noise (e.g., how much noise an optical amplifier may introduce), amount of NLE or other impairments (including NLE or other impairments due to interaction of multiple subcarriers on a channel), a number of ports, the wavelengths (or carriers or subcarriers) that may be used or available, and the like. For example, optical parametric information may include an amount of signal attenuation or power loss due to an optical fiber, and the amount of insertion loss by an optical splitter or OADM, as examples.

In an example embodiment, one or more OCP control devices 126 may determine the optical feasibility of an optical path (for one or more combinations of optical subcarriers), in response to a bandwidth request message, or a resource request. In this example, optical feasibility of a path (for one or more combinations of optical subcarriers) is determined after a bandwidth request message or resource request has been received and the path determined. This may be referred to as a real-time, or on-the-fly optical feasibility calculation since the optical feasibility calculation may be performed after or in response to a bandwidth request message or resource request for a DWDM network.

In a simple example optical feasibility calculation, the path (and a specific route and specific set of optical resources) may be considered to be optically feasible if the power of the optical signal received at a destination node (or egress optical node of the WDM network, such as transponder 121B) is greater than or equal to the receiver sensitivity (or minimum required power) of the destination node (or egress node). For example, an OCP control device (either by itself, or in a distributed manner), may receive the resource request with a current signal power, subtract the cumulative power losses along the path for the next hop (due to the various components along the path) and then forward the request on to the next node along the path with a new signal power value. Other optical nodes (or their OCP control devices) may similarly subtract power losses for their portion of the network, and at the destination node, e.g., transponder 121B, if the indicated received optical signal power is greater than a threshold (e.g., greater than or equal to receiver sensitivity at the destination node), then the path may be considered to be optically feasible for a specific set of optical subcarriers. A message may be sent back to the ingress node to indicate reservation of the specified optical resources (e.g., multiple subcarriers and ports). Note that the various power losses or impairments may be different for different sets of optical subcarriers. Otherwise, if the indicated power at the destination node along the path indicates that the received OSNR (or signal to interference and noise ratio) is below the required minimum in this example, the path may be considered not to be optically feasible, and an error message may be forwarded across the OCP control devices of the path back to the ingress or original optical node 121A that received the request to request another feasibility calculation for another path or combination of optical subcarriers. The process may then be repeated for the new path/route and/or for the new combination of optical subcarriers (e.g., SC1 and SC4, instead of SC1-SC5). This is a simple example, and other types of optical feasibility calculations may be performed. This example refers to the distributed optical control plane (including OCP control devices at each or a plurality of optical nodes) performing optical feasibility calculations in a distributed manner.

For example, a bandwidth or resource request may be sent by router 120 and received by transponder 121A, where the resource request may indicate 100 Mbps and a destination of router 124 or transponder 121B. The OCP control device 126 for transponder 121A may send a request to a next node (e.g., 122A) to request an optical feasibility calculation for a set of optical subcarriers (e.g., SC1-SC5), and this request is forwarded on to the destination optical node 121B, to determine if the signal would be optically feasible for this path, route and for this set of optical subcarriers. Thus, in this manner, an optical feasibility calculation may be performed for a specific path for SC1-SC5. However, it may be determined that for this path, the use of these 5 subcarriers SC1-SC5 is not optically feasible, e.g., because the OSNR of the signal at the destination node (e.g., transponder 121B) is not greater than the required minimum. Thus, an error message may be sent by destination optical node 121B and may be forwarded via OCP control devices along the path to OCP control device for the ingress node or transponder 121A. In an example, a request for optical feasibility is then sent by node 121A for a new combination of optical subcarriers (e.g., SC1, SC3, and SC5) may be sent to the next OCP control device along the path. The OCP control device 126 of the destination optical node 121B may determine that this path and combination of optical resources is optically feasible, and may return a message indicating that such path and resources are optically feasible, and may request reservation of such resources. Each OCP control device along the path may then reserve the indicated optical resources (identified optical subcarriers SC1, SC3 and SC5) for this path.

Some paths (or routes) may be optically feasible only for certain optical wavelengths or only for certain groups or subsets of optical carriers/subcarriers, e.g., where a multicarrier group may be used to transmit the signal over a channel. For example, a path for a first wavelength or first combination of optical subcarriers may be optically feasible, while the same path for a second (or different) set of optical subcarriers may not be optically feasible due to different levels of performance by different wavelengths or for different combinations of optical carriers or subcarriers, at least in some cases. This may be due to, for example, different optical impairments for different wavelengths or for different combinations of optical subcarriers. Other measurements or criteria (other than SNR or SINR of the optical signal) may be used to determine optical feasibility, such as bit error rate of the signal at the receiving or destination node, etc.

As noted, one or more OCP control devices 126 may determine whether or not an optical path and route is optically feasible for a set of optical resources (e.g., a set of optical subcarriers). If it is not optically feasible, an error message may be generated, and the GMPLS control plane 118, in some cases, may then find or determine a new path and/or a new route between the source node and destination node, and/or identify or select a new set/subset of optical resources for the same or different path/route. Although not shown in FIG. 1, each node or router may include a GMPLS control plane control device 118A, 118B, . . . Again, the optical control plane may determine whether this path and route is optically feasible for the (e.g., new) set of optical resources. Eventually, a path and route and set of optical resources may be identified that is optically feasible, resources may be allocated or reserved for the path, and data may be transmitted across the optical network, pursuant to the request for resources/bandwidth.

In another example embodiment, the optical feasibility for a path, route and a set of optical resources may be determined or calculated in advance (e.g., prior to the request for bandwidth or optical resources) and a list of pre-validated paths 128 may be generated and stored in memory at one or more nodes, for example. Thus, in an example embodiment, a path pre-validation tool 110 may pre-validate one or more paths (for one or more combinations of optical carriers/subcarriers), which may include confirming that a path (e.g., for as specific path and set of optical resources) is optically feasible. A list of pre-validated paths maybe provided via line 114 to a network management application 116. Network management application 116 may provide the list of pre-validated paths to each (or to one or more) of the optical nodes 122, e.g., via GMPLS CP 118. The list of pre-validated paths 128 may be stored in the distributed network database 130. For example, a copy of the list of pre-validated paths 128 may be stored in each (or at least one or more) of the optical nodes 121A, 121B, 122A, 122B, etc. A copy of the pre-validated paths 128 may also be stored in each (or one or more) routers.

When a resource request is received at an optical node 121A from router 120 (for example), e.g., specifying an amount of resources (which may be specified as a bandwidth, data rate, optical class, quality of service, or similar parameter), a source (or source node) and a destination (or destination node), the receiving or ingress optical node 121A may compare one or more parameters of the resource request to the list of pre-validated paths 128. For example, the receiving node may compare the data rate, source and destination of the resource request to the data rate (or corresponding optical class), source and destination nodes of each pre-validated path, to determine if there is a match. The resource (or bandwidth) request may specify the source and destination as addresses, such as, for example, IP (Internet Protocol) addresses, or other identifiers. Thus, in one example embodiment, the source and destination IP addresses for the resource request may be compared to source and destination IP addresses in the list of pre-validated paths 128. If there is a pre-validated path in the list 128 that matches (fulfills, or at least partially fulfills) the bandwidth request, then the receiving optical node 121A may, at least in some cases, skip the optical feasibility calculation, since this path has been pre-validated or pre-calculated, and thus, it is already known that the pre-validated path is optically feasible. The list of pre-validated paths 128 includes a list of paths, where optical feasibility calculations has been (previously) performed for each path to confirm that each path on list 128 is optically feasible. Therefore, there is no need to repeat the optical feasibility calculations in response to receiving the resource request. In this case, where a path in the list of pre-validated paths 128 matches (or fulfills or at least partially fulfills, e.g., fulfills a portion of the requested data rate) the resource request, the receiving optical node 121A may skip the optical feasibility calculations (since this path was previously determined as being optically feasible), and may send a message (e.g., via the GMPLS CP 118) to reserve resources along the pre-validated path, such as using RSVP or resource reservation protocol.

In one example embodiment, if a path in the list of pre-validated paths 128 matches the source and destination, but only partially fulfills the requested data rate or bandwidth, this combination of resources may be allocated for this resource request, and a message (e.g., flow control or other message indicating a decreased data rate) may be sent to the requesting node indicating that the request is granted but at a lower data rate or lower amount of resources than what was requested, or to otherwise request the router or requesting node to transmit or provide a lesser amount of data due to constrained resources. Or, a backpressure or flow control message may be sent to the requesting node to request lower amount of data to be transmitted, or to slow the flow of data to the receiving optical node 121A. For example, the subcarriers SC1, SC3 and SC5 provide an optically feasible path from router 120 to 124, but at 60 Mbps instead of a requested 100 Mbps, this path in the list 128 may be used to (at least partially) fulfill this resource request, at least in some example cases. Thus, a backpressure message may be sent, e.g., from receiving node 121A to requesting node 120 to request a lower data rate, indicate that 100 Mbps data rate will not be provided, or otherwise slow the rate of data being sent to node 121A for forwarding. This backpressure message may be a flow control message, or any other control message that may be used to adjust the rate of data flow, for example.

After the resources along the path have been reserved or allocated, the data service may be provided, e.g., data may be transmitted along the matching pre-validated path. In this manner, through the use of the list of pre-validated paths, circuit provisioning delay may be reduced because the optical feasibility calculations for each pre-validated path has been performed in advance (e.g., before receipt of a resource request) for each path on the list 128, and the feasibility calculations need not be repeated for such path. This may typically decrease the time needed to provision an optical circuit on the network and/or reduce usage of network resources, according to an example embodiment.

According to an example embodiment, each of the pre-validated paths (or pre-validated label switched paths) may be defined by the following (or by one or more of the following):

Source and destinations, e.g., source node and destination node (these may be the router (e.g., 120) that provides the request at the ingress side, and the router (e.g., 124) at the egress side), or this may be the ingress optical node (e.g., 121A) that receives the request and the egress optical node (e.g., 121B).

Explicit path route, e.g., the hop-to-hop route from source node to destination node; thus, two different paths may have the same source and destination nodes, but may have different routes therebetween.

The wavelength (or optical channel) or set or combination of optical carriers or subcarriers that can be used or assigned to the path along the route;

Optical class: the optical class identifies characteristics of the optical path, such as, for example, bitrate or data rate, modulation scheme and/or coding rate, minimum OSNR (optical signal to noise ratio) target, maximum CD (chromatic dispersion) robustness, etc. These are merely some example characteristics that may be defined by an optical class, other characteristics or parameters may be included or defined as well.

In an example embodiment, path pre-validation tool 110 may receive network information via line 112. Network information may include, for example (but not limited to): information describing a topology of the network (or network configuration), and optical parametric information for elements or components in the network. The optical parametric information may be provided for elements or components in the network, such as for, e.g., optical splitters, OADMs, optical amplifiers, optical fibers, and other components in the network 100. The optical parametric information may include any information that may describe elements or the operation of the elements, such as the increase or decrease in power (such as optical signal attenuation) introduced by an element, optical noise introduced by an optical amplifier, a number of ports for an optical node, the wavelength(s) that may be used or available, receiver sensitivity (or minimum required optical power for a received signal), and the like. For example, optical parametric information may include an amount of signal attenuation or power loss due to an optical fiber, and the amount of insertion loss (power loss) by an optical splitter or OADM, signal distortion or attenuation due to NLE (e.g., four wave mixing) for various combinations of optical subcarriers, as examples.

Path pre-validation tool 110 may pre-validate one or more paths (and combinations of optical subcarriers) based on the received network information. As noted, copies of the list of pre-validated paths 128 may be transmitted from the network management application 116 to each (or one or more) of the optical nodes and stored in the distributed network database 130, e.g., which may be a copy of the list of pre-validated paths stored in memory of each.(or one or more) of the optical nodes.

Pre-validation may refer to the optical feasibility calculation for a path and combination of optical subcarriers being performed in advance, e.g., before a resource request or bandwidth request is received and matched to such pre-validated path. Pre-validation may occur, for example, during the network design phase, or during network deployment, or after a network is complete or deployed. If a network is updated or changed, e.g., network elements are added, changed or removed or reconfigured, or new optical subcarrier combinations are made available, then paths may then be re-validated by the path pre-validation tool 110. In such case, an updated list of pre-validated paths may be transmitted from network management application 116 and stored in distributed network database 130 (e.g., replacing the now outdated or inaccurate list 128 of pre-validated paths that was previously stored in database 130).

In one example embodiment, network management application 116 may receive messages from optical nodes via GMPLS CP 118 that provide updates as to components in use and network topology of the network 100, and combinations of optical subcarriers that are available. For example, network management application 116 may receive message(s) indicating that a group of optical nodes have been added, or that an optical node has been removed or is non-operational (either temporarily or permanently), or that some other change has occurred to optical network 100. Based on the messages received indicating such change, network management application 116 may send a message to path pre-validation tool 110 indicating that a change has occurred, and may identify details of the change. This message may cause path pre-validation tool 110 to obtain updated network information (if not already received), and re-validate one or more paths (and/or re-validate a path for one or more combinations of optical subcarriers) for network 100, and, then provide the updated list of pre-validated paths to network management application 116, which is then provided to database 130, for example.

Figure 4:
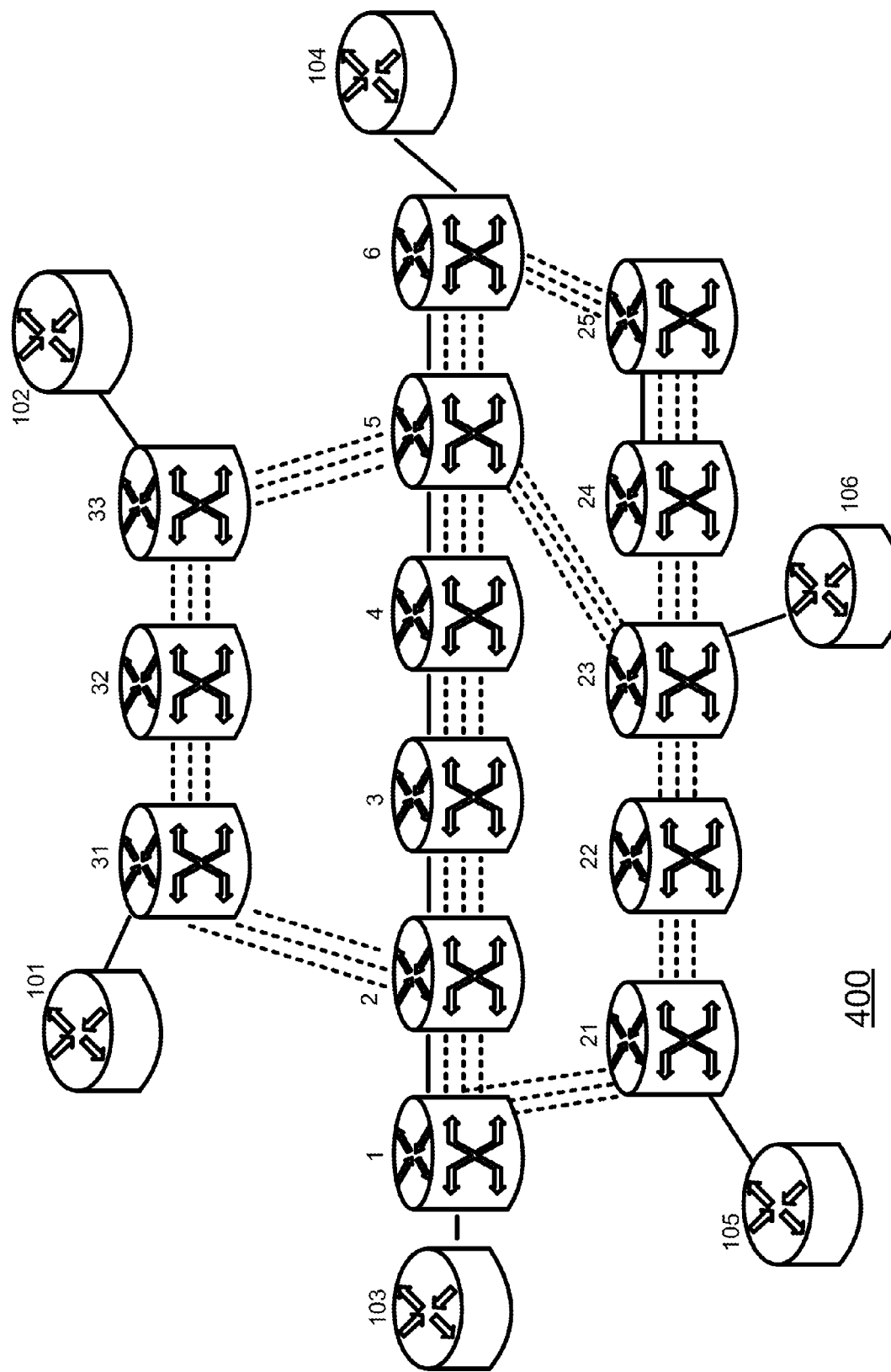
FIG. 4 is a diagram illustrating operation of an optical network according to an example embodiment.

FIG. 4 is a diagram illustrating operation of an optical network according to an example embodiment. The network 400 may include a number of routers, including routers 101, 102, 103, 104 and 105. Network 400 may also include a number of optical nodes (e.g., transponders and/or OADMs), such as optical nodes 1, 2, 3, 4, 5, 6, 21, 22, 23, 24, 25, 31, 32, and 33. The four parallel dashed lines connecting adjacent nodes represent four optical channels. Each channel may be, for example, a 100 GHz channel that provides a group (e.g., five, or other number) of optical subcarriers, similar to that shown in FIGS. 1 and 2. For example, channel 1 may include five 20 Gbps subcarriers SC1-SC5 as shown in FIG. 1. Similarly, the other three channels may each include a group of optical subcarriers. For simplicity, a number of elements or blocks shown in FIG. 3 may be present in FIG. 4, but are not shown, such as, e.g., path pre-validation tool 110, network management application 116, distributed network database 130, the electrical and optical control planes, etc. Also, the optical nodes (such as nodes 1, 6, 31, 33, 21 and 23) adjacent to one of the routers (such as routers 101, 102, 103, 104, 105 or 106) may include an optical transponder.

In a first example referring to FIG. 4, a list of pre-validated paths may have been calculated by path pre-validation tool 110 and stored in distributed network database 130 (e.g., each node may include a copy of the list of the pre-validated paths 128).

In this first example, the list of pre-validated paths 128 stored in distributed network database 130 may include at least two paths or LSPs (label switched paths), including LSP1, and LSP2, for example:

1) LSP1 (or label switched path 1 or path 1, with a combination of five optical subcarriers): Source 1 (identifying optical node 1), Destination 6 (identifying optical node 6)

Route: 1-2 (from optical node 1 to optical node 2), 2-3 (from optical node 2 to optical node 3), 3-4 (from optical node 3 to optical node 4), 4-5 (from optical node 4 to node 5), 5-6 (from node 5 to node 6). This identifies the hop-to-hop route for this path or LSP.

Combination of optical subcarriers: SC1, SC2, SC3, SC4 and SC5, e.g., see FIG. 1.

Optical Class=A. As noted above, the optical class may identify various characteristics of the optical path, such as, for example, requested data rate, modulation scheme and/or coding rate, minimum OSNR (optical signal to noise ratio) target, maximum CD (chromatic dispersion) robustness, etc., as examples. Thus, different optical classes may indicate different values for each of these characteristics or parameters. As noted above, the requested optical class/requested data rate may be completely fulfilled, or may be partially fulfilled (e.g., by using a smaller number of optical subcarriers to extend optical reach of a signal, but at the cost of a lower data rate). In this example, the optical class may be associated with a 100 Gbps data rate, e.g., based on the 5×20 Gbps subcarriers.

Reserved=NO (According to an example embodiment, the resources for this path have not been reserved, and thus, may be available for usage not only by LSP1 but also for any other LSP in the network, regardless whether pre-validated or not).

LSP2: Source 1, Destination 6

Route: 1-21, 21-22, 22-23, 23-24, 24-25, 25-6 (Note that this is a different and longer route than for LSP1, but still provides a route between node 1 and node 6).

Combination of optical subcarriers: SC1, SC3, and SC5. (e.g., 20 Gbps for each subcarrier, providing 60 Gbps total).

Optical Class=B (e.g., associated with a 60 Gbps data rate).

Reserved=NO

Note that LSP1 and LSP2 identify the same path (from node 1 to node 6), but take different routes. LSP2 uses one more node or hop to reach node 6. Thus, in this example, LSP2 is longer and may typically have greater signal attenuation and distortion as compared to LSP1, in this example. Thus, while LSP1, in this example, is optically feasible with all five optical subcarriers SC1-SC5, LSP2, in this example, is optically feasible with using no more than three of the five subcarriers (such as SC1, SC3, SC5), and is not optically feasible when using all five subcarriers SC1-SC5. Thus, LSP2 provides a longer optical reach, as compared to LSP1 in this example, based on providing an unused or inactive subcarrier (SC2 and SC4) between the three active subcarriers, as shown in FIG. 2. The unused bandwidth (SC2, SC4) space between SC1 and SC3, and between SC3 and SC5 may, for example, reduce NLE or four wave mixing (or reduce other optical impairments), which may thereby increase the OSNR of the received signal and allow the signal to travel the longer path associated with LSP2 while still providing a minimum OSNR at the destination, e.g., node 6. However, LSP2 provides only 60 Mbps based on use of 3 subcarriers, whereas LSP1 provides 100 Mbps based on the use of all five subcarriers in the multi-subcarrier group. This is merely one example, and is provided for illustrative purposes. Other examples may be used as well.

In an example embodiment, a resource request (or bandwidth request) may be received at optical node 1 (e.g., from router 103). Router 103 may request data service from router 103 (source node) to router 104 (destination node), and a data rate or bandwidth for bandwidth or data rate of 100 Mbps.

Ingress node 1, for example, may compare one or more parameters of the resource request to the pre-validated paths 128 stored in the distributed network database 130 to determine if there is a match (a pre-validated path that fulfills, or at least partially fulfills, the requested resources). The resource request may identify the source (or source node) and the destination (or destination node) by a source address and a destination address (provided in the resource request), respectively. The source and destination addresses may be specified as Internet Protocol (IP) addresses, for example, or other types of addresses or node identifiers. The receiving node or ingress node or ingress router, may map the source and destination IP addresses to corresponding nodes (e.g., routers or other nodes) in the network having (or being assigned) the specified IP addresses, for example. For example, the ingress node 1 may determine a node 1 as the source node and node 6 as the destination node based on the source IP address and destination IP address of the received bandwidth request message. Also, if necessary, the ingress node may map a requested data rate or bandwidth to a corresponding optical class, e.g., in order to compare the resource request to the list of pre-validated paths 128. Thus, the ingress node may compare an optical class corresponding to the requested data rate or bandwidth to the optical classes of entries in the list of pre-validated paths 128, for example.

Thus, ingress node 1 may perform a comparison of the source (or source node), destination (or destination node) and requested data rate/bandwidth/optical class of the resource request to the same (or corresponding) parameters of each entry in the list of the pre-validated paths 128 stored locally (or in the distributed network database 130). For example, the source node 1, destination node 6, and data rate/optical class=100 Mbps, e.g., to determine if the bandwidth request matches the same parameters of the pre-validated path LSP1, which may be listed in the list of pre-validated paths 128.

Next, the ingress optical node 1 may determine whether the resources for this matching pre-validated path LSP1 have been reserved or not. In this case, the list of pre-validated paths 128 indicates that the resources for LSP1 are not reserved (and thus may be available).

Next, the ingress node may send a message (e.g., RSVP Path message) to the next downstream node (node 2) requesting resources for the path LSP1, and identifying, e.g., the data rate (or similar bandwidth or quality of service, or optical class) and the optical subcarriers (e.g., SC1-SC5). Assuming requested resources (e.g., optical subcarriers, and ingress/egress ports of the node 2) are available at node 2, node 2 may then forward the RSVP Path message onto the next downstream node, e.g., node 3. This process may be repeated until the RSVP Path message reaches the destination node (node 6). Node 6 may then reply with a RSVP Allocation or Reservation message indicating that requested optical resources have been allocated (e.g., ports of the node, and the wavelength have been allocated), which is forwarded to node 5 (the next upstream node); Node 5 then forwards the RSVP Allocation/Reservation message to node 4, and etc., until the RSVP Reservation (or Allocation) message reaches node 1, which indicates the requested optical resources have been allocated or reserved from source to destination along the route indicated for LSP1 to provide the requested data service for LSP1. The reservation of resources along a path from node 1 to node 6 is indicated in FIG. 4 with a solid line from nodes 1 to 6, e.g., with the solid lines between each node indicating that the corresponding group of optical subcarriers SC1-SC5 have been reserved for use.

After a matching pre-validated path (LSP1 in this example of FIG. 4) has been identified from the list 128, and resources in the optical network have been reserved for this path, ingress node 1 may then receive data from router 103 and may begin transmitting the data over the LSP1 to node 6, using the pre-validated path LSP1 (e.g., via the reserved resources).

In one example embodiment, during transmission of data via LSP 1 (or at another time), the network may be reconfigured due to congestion or due to a problem with one of the nodes (or for some other reason). This may require routing or sending the data over a different hop-to-hop route to reach node 6. Thus, the path may be changed or re-routed, which allows the data to travel from node 1 to node 6, but over a different hop-to-hop route. Node 1 (or other node) may determine a new hop-to-hop route for the data between nodes 1 and 6. The node 1 may search the list of pre-validated paths 128 to identify the new route, and determine that such path is optically feasible, which is indicated by its presence on the list of pre-validated paths 128. Or the new route may be determined in a distributed manner using GMPLS control plane (GMPLS CP) control device at each node, and the optical feasibility of such new route may be determined in a distributed manner using the optical control plane (OCP) control device 126 provided at each node.

After the path for a data signal has been rerouted (or a new route determined), the ingress node 1 may determine whether or not such new route is optically feasible for the same group of optical carriers, or for the group of optical carriers that may fulfill the data request, e.g., all five optical carriers SC1-SC5, so as to provide 100 Gbps service. Optical feasibility may be performed in a distributed manner, by a central device (or by one node), or by identifying a path/route in the list of pre-validated paths 128 that fulfills, for the new route. In this example, it may turn out that the new route (corresponding to the route of LSP2) is not optically feasible when using all five subcarriers SC1-SC5.

Next, it may be determined whether there is a set of optical resources that at least partially fulfills the data request for this path/route. For example, optical feasibility calculations may be performed (e.g., by a one node or a central node), in a distributed manner via the OCP control devices, or via lookup in the list of pre-validated paths 128. For example, the path (from node 1 to node 6) for LSP 2 may be identified, and it may be determined (either via distributed OCP, via one node, or via lookup into list 128) that subcarriers SC1, SC3 and SC5 may be used for this route and are optically feasible for this route/path, providing a data rate of 60 Gbps. After the LSP2 is selected for transmitting this data (to replace usage of LSP1), a tear down message may be sent from node 1 to node 6 that instructs nodes along the LSP1 path to release their resources reserved for this data transmission, which frees up these resources for other uses.

The resources (e.g., SC1, SC3 and SC5) of the new path/route combination (for LSP2) may be reserved (e.g., by sending messages or a message across the route to reserve the resources SC1, SC3 and SC5 and ports at each node along the route), and lasers at a transponder, e.g., at the transponder of ingress node (e.g., node 1), may deactivate the unused subcarriers SC2 and SC4. The deactivation of unused subcarriers (e.g., SC2, SC4) along the route for LSP2 (e.g., that were previously active for LSP1) may be deactivated in response to the tear down message, for example, or in response to a separate message. Thus, in this example, subcarriers SC1, SC3 and SC5 are active, while subcarriers SC2 and SC4 are inactive for LSP2, to supply a 60 Gbps data service.

In an example embodiment, a backpressure message may be sent from node 1 to router 103 to request a lower data transmission rate (e.g., since 60 Gbps service provided via SC1, SC3 and SC5 is lower than requested 100 Gbps), to decrease the data transmission from router 103 to node 1, or otherwise indicate that a lower data rate service will be provided by the network 400. For example, an Ethernet flow control message, an IEEE 802.3x Pause message (to pause the transmission of data for a period of time) or other control message may be used as a backpressure message, e.g., to slow down the transmission of data, or to temporarily halt or slow down the transmission of data from the router 103 (e.g., the node that is forwarding the data and/or requesting data service or requesting bandwidth over the optical network) to node 1 (or the ingress node or ingress transponder, etc., or other node, of the optical network).

After the data has been transmitted, the path may be torn down by the ingress node 1 sending a tear down message across the path, from node 1 to node 6, which frees up (or makes available again) the reserved resources that were used for this LSP2.

In another example embodiment, the LSP or path (e.g., LSP2) that matches a requested path/route may not be on the list of pre-validated paths 128. In such case, the ingress optical node may, on-the-fly, use OSPF (open shortest path first routing algorithm) to determine a route from node 1 to node 6, e.g., via GMPLS CP 118. For example, GMPLS OSPF-TE may be used to allow the optical nodes to exchange OSPF messages (e.g., hello message or other messages) that allow the nodes and routers to learn network topology, for example. Once a route is determined (either using OSPF or a previously known or specified route), the ingress node (e.g., node 1) may use the optical control plane (OCP) to determine (e.g., in a distributed manner) the optical feasibility of such path/route and combination of optical subcarriers. Optical feasibility calculations may be performed for one or more different sets of subcarriers for this path/route, e.g., to identify one or more sets of subcarriers that are optically feasible for this path/route. If more than one set of subcarriers are optically feasible for this path/route (e.g., corresponding to the path route of LSP2), then the set of subcarriers that best fulfills the bandwidth request or provides the highest data rate, or provides the best performance, etc., may be selected, according to an example embodiment. If a path/route and a set of optical subcarriers is determined to be optically feasible, then RSVP messages may be sent from node 1 to node 6 along the hop-to-hop route (e.g., same route as LSP2) to reserve the resources (e.g., reserve ports on each node and the specified optical subcarriers).

Figure 5:
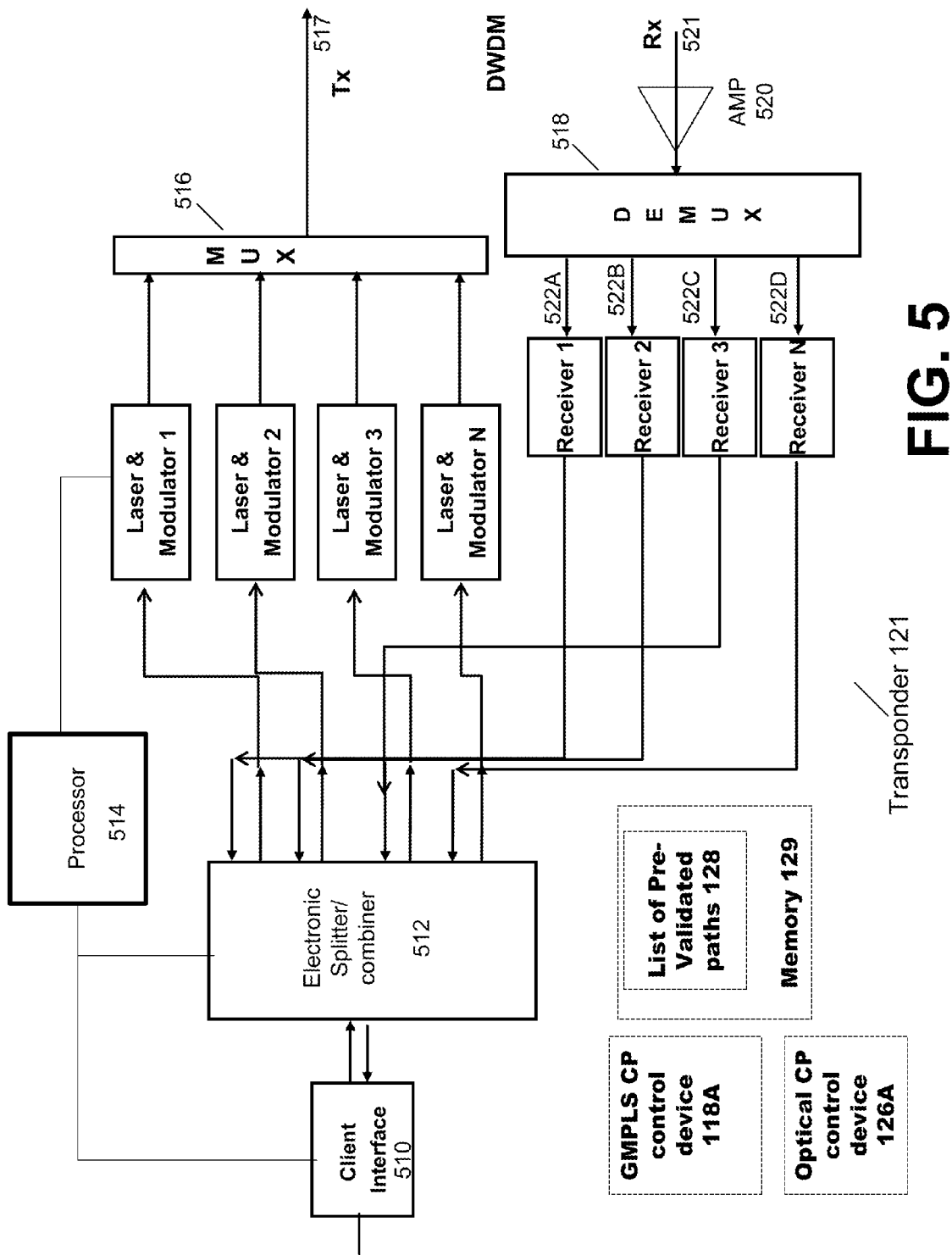
FIG. 5 is a block diagram of an optical transponder according to an example embodiment.

FIG. 5 is a block diagram of an optical transponder according to an example embodiment. Transponder 121 may include a processor 514 for providing overall control of transponder 121, a client interface 510, an electronic splitter/combiner 512, a plurality of lasers and modulators, a plurality of receivers, a multiplexer (or MUX) 516, and a demultiplexer (or DEMUX) 518, and an amplifier 520.

Client interface 510 may interface with an adjacent node. For example, transponder 121A in FIG. 3 may include-client interface 510 to interface with router 120. Client interface 510 may include a network interface card (or NIC) and associated software, such as an Ethernet NIC and Ethernet software, along with other protocol software to exchange data and packets with router 120. Ethernet is merely an example, and other protocols may be included within the client interface 510, such as Internet Protocol (IP), etc. The client interface 510 may receive data from an adjacent router or node (such as router 120, FIG. 3), e.g., as one or more packets, and may generate a data signal, which may be output to electronic splitter/combiner 512.

An electronic splitter/combiner 512 may electronically split or combine signals, depending on the direction. For example, the combining and splitting of signals may be performed on electrical signals. Electronic splitter/combiner 512 may split the received data signal (received via client interface 510) into a plurality of sub-signals, e.g., with each sub-signal including some of the data or bits included in the received data signal. One sub-signal may be provided for each active subcarrier that is being used to transmit the data signal. Or, in other words, the received data signal may be spread or transmitted across the plurality of active subcarriers.

Referring to FIG. 5, transponder 121 may include one or more modulators and lasers, including laser & modulator 1, laser & modulator 2, laser & modulator 3, ... laser & modulator N, e.g., with one laser/modulator being provided for each optical subcarrier for the multi-subcarrier group. Each laser/modulator for an active subcarrier may receive a sub-signal (or a portion of the received data signal), and the modulator may modulate an associated optical subcarrier based on the sub-signal, and the laser may transmit or output the modulated optical subcarrier to a multiplexer 516. Multiplexer 516 may combine the plurality of modulated optical subcarriers and transmit them via an optical fiber 517 to a next optical node.

An amplifier 520 may receive and amplify optical signal(s) received via an optical fiber 521. The optical signal(s) received via optical fiber 521 may include a plurality of optical carriers or subcarriers, such as subcarriers for a multi-subcarrier group (or for a plurality of multi-subcarrier groups). A demultiplexer (or Demux) 518 may demultiplex or separate the plurality of optical subcarriers received via optical fiber 521 into separate signals, and output each subcarrier onto a different output, e.g., with a first subcarrier output onto line 522A, a second subcarrier output onto line 522B, a third subcarrier output onto a line 522C, ... and a Nth subcarrier output onto line 522d. The first, second, third, ... and Nth received optical subcarriers may be received, and converted to an electrical signal and demodulated by a receiver 1, receiver 2, receiver 3, ... and receiver N, respectively, as shown in FIG. 5. Electronic splitter/combiner 512 may then, for example, combine the (up to) N signals of the multi-subcarrier group into a single electrical data signal to be sent to client interface 510. Client interface 510 may then forward the data to the adjacent router or node, e.g., via one or more packets. Thus, the transponder 121 may perform electrical to optical signal conversion for signals received from client interface 510 to be transmitted via optical fiber 517, and transponder 121 may perform optical to electrical signal conversion for signals received via optical fiber 521 to be forwarded to client interface 510.

Processor 514 may be coupled to one or more, or even all components or blocks shown in FIG. 5, such as being coupled to client interface 510, electronic splitter/combiner 512, lasers/modulators 1, 2, 3, ... N, and receivers 1, 2, 3, ... N. Processor 514 may execute computer instructions stored in memory 129, which may be a non-transitory computer readable storage medium, and may provide overall control of the operation of transponder 121.

Although FIG. 5 illustrates components or blocks (e.g., a set of lasers and modulators and a set of receivers) to process one optical channel (both receive and transmit, e.g., via different channels), it is understood that the transponder 121 may include components and blocks for a plurality of optical channels, with each channel may include a group of optical subcarriers, for example. While a set of lasers/modulators, and receivers are shown only for one multi-subcarrier group, there may be M such sets of lasers/modulators and receivers, with one set for each of a plurality of optical channels, where each optical channel may include a multi-subcarrier group of optical subcarriers, e.g., with a laser/modulator and a receiver provided for each subcarrier, according to an example embodiment.

As shown in FIG. 5, transponder 121 may also include a copy of the list of pre-validated paths 128 stored in memory 129, a GMPLS control plane (CP) control device 118A, and an optical control plane (CP) control device 126A. Control devices 118A and 126A may include, for example, software or computer instructions stored on memory 129 and executed by processor 514.

Referring to FIG. 5, there may be a laser & modulator for each subcarrier of a multi-subcarrier group, e.g., for each of the N subcarriers. In an example embodiment, a plurality of the lasers (or lasers/modulators) may be activated (e.g., by processor 514) to transmit a signal via a group or plurality of (active) optical subcarriers. When activated, for example, a laser/modulator may receive a data signal, and may e.g., modulate the data signal onto an associated optical subcarrier for transmission via an optical fiber, for example. Similarly, one or more of the lasers (or lasers/modulators) may be deactivated by processor 514, e.g., in which the laser/modulator may not receive a data signal, and/or does not transmit an optical signal, for example, and this may cause an associated subcarrier be inactive (e.g., no signal transmitted via the subcarrier), for example.

As noted, it may be advantageous in some cases to deactivate a laser (or laser/modulator) for a subcarrier so that the subcarrier is inactive, as this may increase the optical reach for a remaining set of active subcarriers of the multi-subcarrier group, e.g., based on a decrease in non-linear effects (NLE) or other optical impairments, at least in some cases. Thus, for example, laser/modulators 1, 3 and N may be activated so that subcarriers 1, 3 and N are active (e.g., transmitting a signal via the subcarrier), and laser/modulator 2 may be deactivated so that subcarrier 2 is inactive (e.g., not transmitting a signal via the subcarrier). In this example, a data signal is transmitted via active subcarriers 1, 3 and N.

Figure 6:
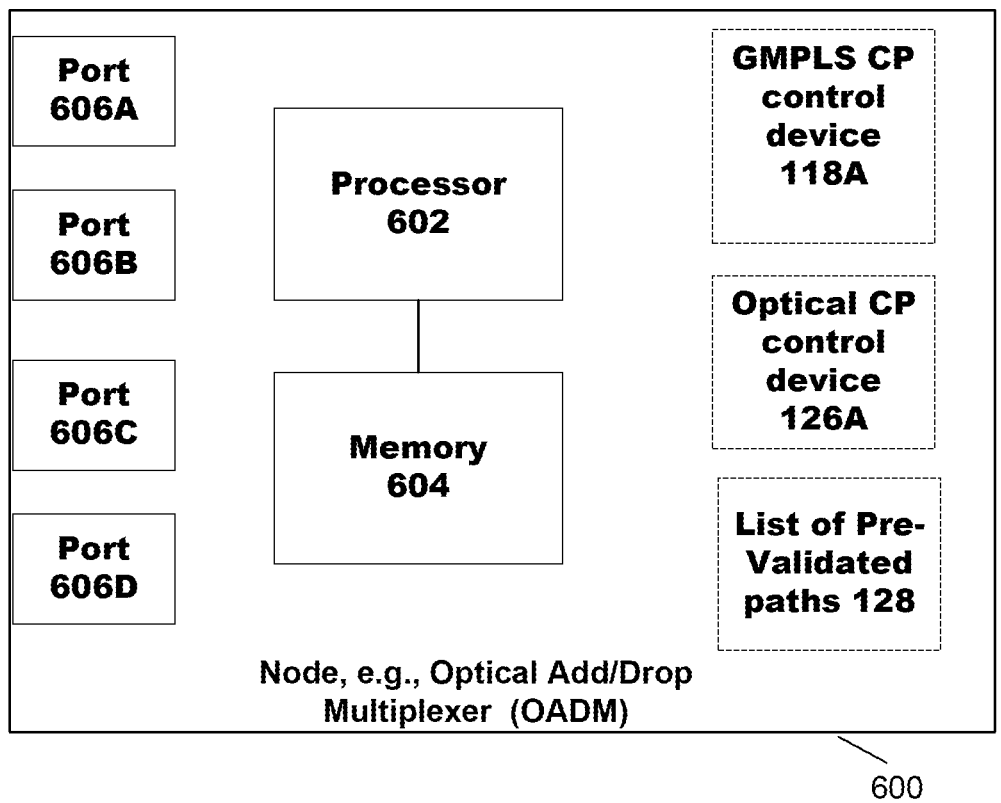
FIG. 6 is a block diagram of a node according to an example embodiment.

FIG. 6 is a block diagram of a node 610 according to an example embodiment. The optical node may be or may include, for example, an optical add/drop multiplexer (OADM), or other node. The node 610 may include a plurality of ports 606, such as ports 606A, 606B, 606C, 606D, etc. While only four ports are shown, any number of ports may be provided. Ports 606 may be, for example, network ports that may provide an interface to another node, or may be optical ports that may provide an interface to an optical fiber. Each port may include a transmitter/receiver for transmitting and receiving data such as an optical transmitter for transmitting signals over an optical fiber and an optical receiver for receiving optical signals over an optical fiber. Each (or one or more) nodes 600 may include a list of pre-validated paths 128, an optical control plane control device 126A, a GMPLS control plane control device 118A, which are described above. Node 600 may also include a processor 602 for executing code or computer instructions and providing overall control for node 122, and a memory 604 for storing information. Memory 604 may be, for example, a non-transitory computer readable storage medium. A router (such as routers 120 and 124) may include the same blocks shown in FIG. 6, except a router 120, 124 typically would not include the optical control plane control device 118, and may not include the list of pre-validated paths 128.

In an example embodiment, an ingress optical node, such as transponder 121A, may determine that transmission of a data signal over a path (such as a label switched path across a network) of a WDM or DWDM network is not optically feasible for a first set of optical subcarriers, and may determine that the transmission of the data signal over the path, (which may be a same or different hop to hop route) is optically feasible. For example, the ingress node, which may be node 121A for example, may determine that a path and route are not optically feasible when using all five subcarriers SC1-SC5 of a multi-subcarrier group. However, an additional optical feasibility calculation may be performed, e.g., in a distributed manner using the optical control plane devices in two or more nodes, or via a lookup into the list of pre-validated paths 128, and may indicate that transmission of the data signal over the same path and route is optically feasible for a subset of the multi-subcarrier group that includes, for example, SC1, SC3 and SC5 (this is merely an example, and any subset of subcarriers may be used). The optical feasibility may be determined for one or more different subsets of subcarriers, for example, until an optically feasible subset or group of subcarriers is identified for a path and route. Processor 514 (FIG. 5) may then activate laser/modulator 1, 3, and 5 so as to provide an active subcarriers 1, 3 and 5, and may deactivate laser/modulator 2 and 4 such that subcarriers 2 and 4 are inactive.

In general, a label switched path (LSP) may be established for the path to allow traffic for the data signal or data flow to be transmitted from source or ingress node to the destination node, e.g., from node 120 to node 124, via one or more intermediate optical nodes or OADMs. A label switched router (LSR), or a LSR capable optical node, may establish the LSP, e.g., using RSVP or GMPLS Path and/or RESV messages, for example. A label switched router or LSR (e.g., such as node 120, 124, as examples, or transponders 121A, 121B) may perform label switching by establishing a relation or association between a <input port, input label> and an <output port, output label>. Optical nodes, such as OADMs, may include an optical cross connect (OXC) for switching an optical data stream between an input port and an output port of the optical node, and for specific wavelengths, subcarriers or channels. Therefore, an optical node may perform switching by establishing a relation or association between an <input port, input optical channel/wavelength> and an <output port, output optical channel/wavelength>. Therefore, for optical nodes or OADMs, labels may be provided as an optical channel, subcarrier, or optical wavelength, for example.

Figure 7:
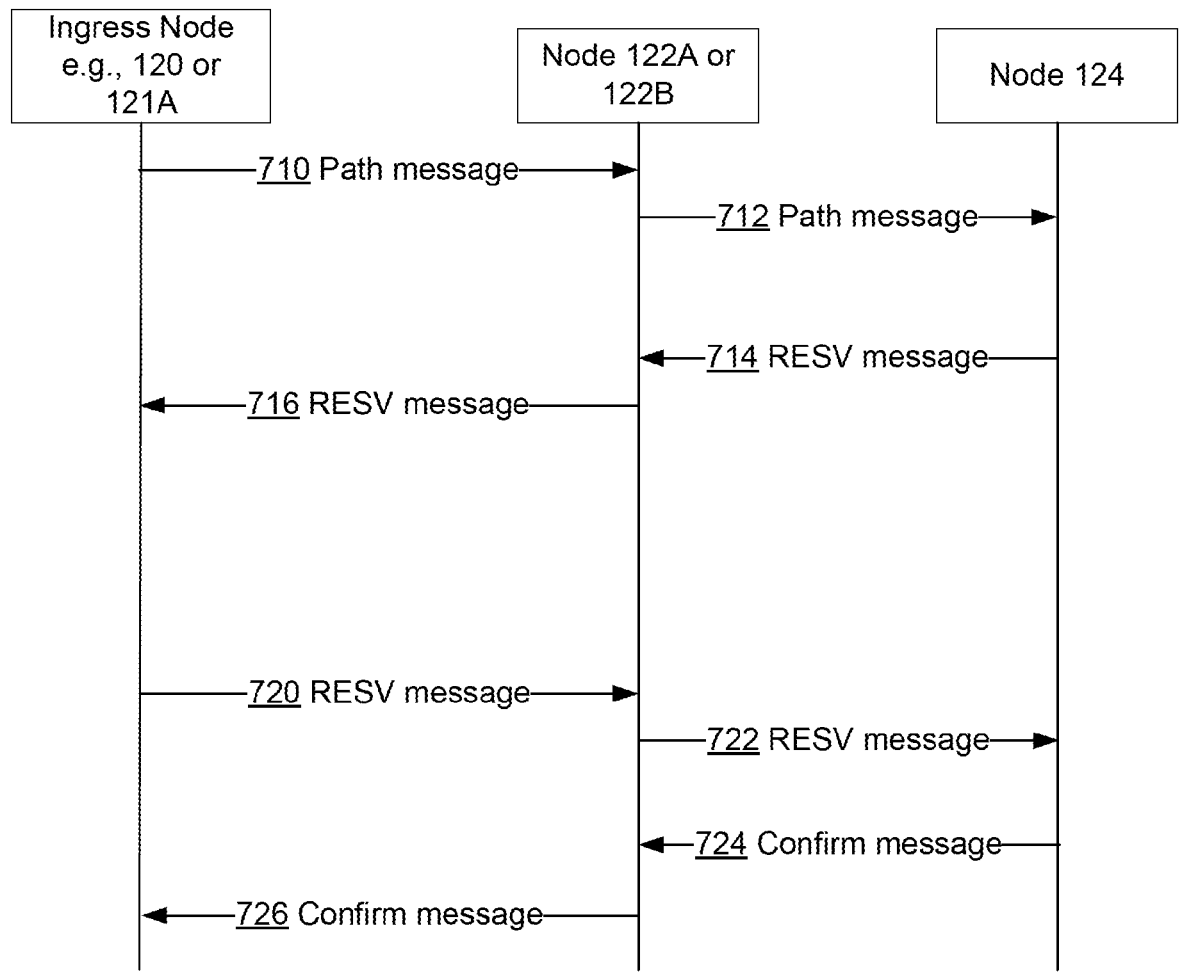
FIG. 7 is a diagram illustrating an example flow of messages that may be used to reserve resources along a pre-validated path according to an example embodiment.

FIG. 7 is a diagram illustrating an example flow of messages that may be used to reserve resources along a pre-validated path according to an example embodiment. A number of different messages or requests may be used, and the illustration in FIG. 7 shows some examples, and others may be used.

Ingress node 120 or 121A may send a RSVP (Resource Reservation Protocol) or GMPLS Path message 510 to a next (intermediate) node 122A (or 122B) or OADM along a matching pre-validated path, e.g., in order to request the reservation or allocation of resources to service this resource request. The packets or data associated with this resource request may be referred to as a flow, for example. The Path message 710 may include or identify a flow ID or a label, information describing the resource request (e.g., the wavelength(s) that are being requested or may be used, a bandwidth or data rate, etc.), and may include the explicit path (the hop to hop route for the matching pre-validated path) for which resources are being requested. Similarly, each intermediate node (only one intermediate node 122A is shown, but any number may be provided) forward the path message along the explicit path to the destination node 124. Therefore, node 122A may send a Path message 712 to destination node 124.

In an example embodiment, destination node 124 may send a reservation (RESV) message 714 to intermediate node 122A, for example. Node 122A, upon receipt of the reservation message 714, may assign resources for this flow (or LSP or resource request), including, e.g., input port and input wavelength/channel/subcarriers, and an output port and output wavelength/channel/subcarriers, and may create a binding or association between the input and output resources, e.g., create an association between the input port/input channel, and output port/output channel. The input and output optical subcarriers may be the same, for example. Or in some cases, the input and output optical subcarriers allocated to a resource request or flow may change. Similarly, node 122A may send a RESV or reservation message (e.g., confirming that resources have been reserved or allocated to service the resource request or flow) to a next intermediate node (not shown). This RESV message may confirm that resources have been reserved, for example, and may identify the port and/or wavelength/channel/subcarriers to be used for that hop (e.g., which may be used by the OXC for optical switching). Each intermediate optical node or OADM may similarly allocate resources (input port/input channel/subcarriers, output port/output channel/subcarriers), and create an association between the input and output resources. Finally, the reservation message 716 is received by the ingress node 120 or 121A, which indicates that resources have been reserved along the matching pre-validated path. The ingress node 120/121A may then begin transmitting data along the matching pre-validated path via the reserved resources.

According to another example embodiment, as shown in FIG. 7, ingress node 120 or 121A may send a reservation (RESV) message 720 requesting that resources be reserved for a flow or data request or LSP. The RESV message 720 may include, for example, include or identify a flow ID or a label, information describing the resource request (e.g., the wavelength(s) that are being requested or may be used, a bandwidth or data rate, etc.), and may include the explicit path (the hop to hop route for the matching pre-validated path) for which resources are being requested. The RESV message 722 is forwarded by intermediate node 122A (and any intermediate nodes may do likewise) to destination node 124. Each optical node or OADM may then reserve or allocate resources for this LSP, flow or data request, including <input port, input optical channel/wavelength/subcarriers> and an <output port, output optical channel/wavelength/subcarriers>. A confirmation message, indicating that resources have been reserved, may be forwarded as messages 724 and 726.

Figure 8:
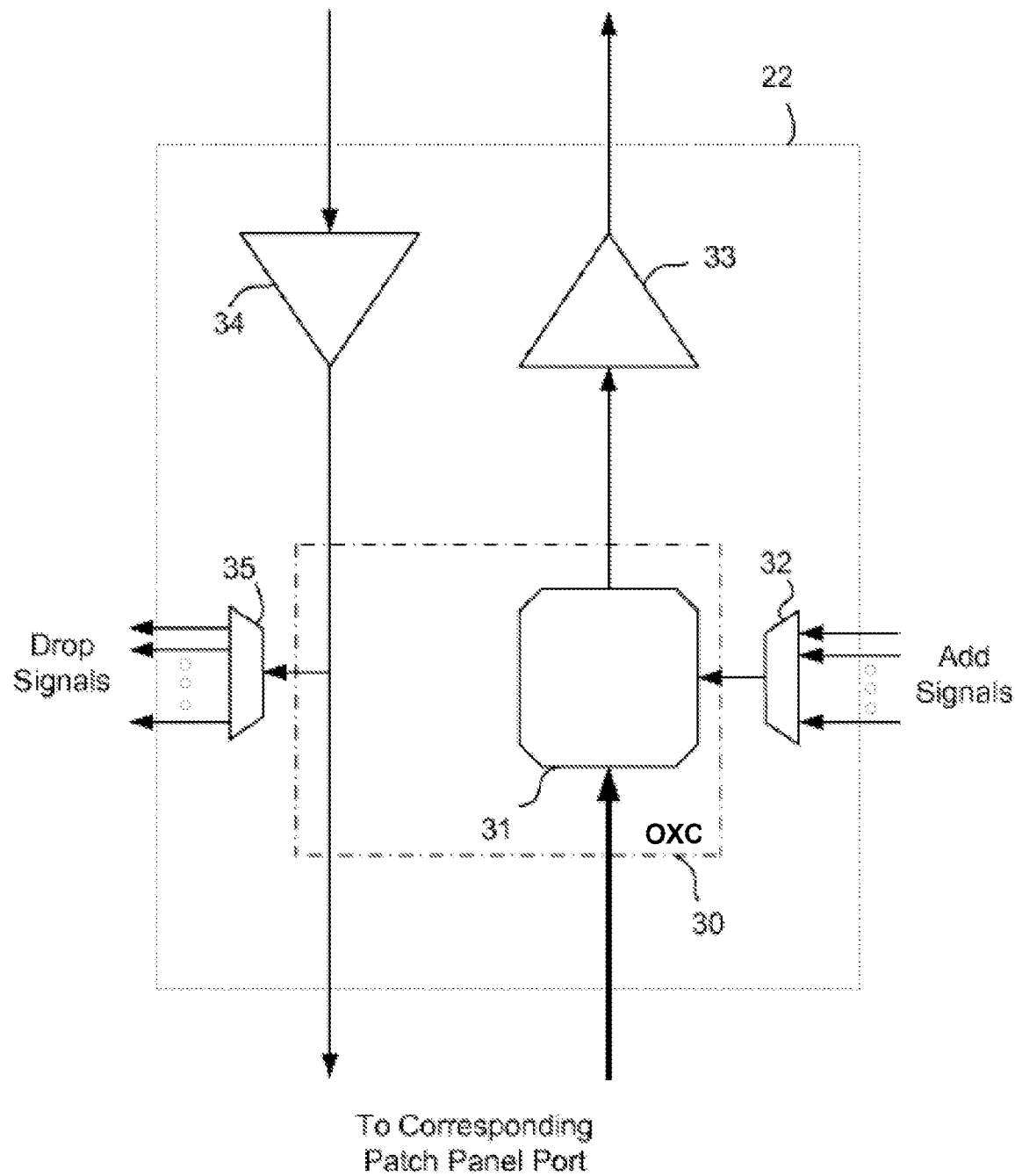
FIG. 8 is a block diagram illustrating a portion of an optical add/drop multiplexer (OADM) according to an example embodiment.

FIG. 8 is a block diagram illustrating a portion of an optical add/drop multiplexer (OADM) according to an example embodiment. The OADM may include a block 22 that may include optical amplifiers 33 and 34, a multiplexer 32 receiving add signals, and a demultiplexer 35 outputting drop signals. The OADM may include an optical cross connect (OXC) 30, which may include a wavelength-selective switch 31. Wavelength selective switch 31 may be controlled by a processor, e.g., by processor 602 (FIG. 6) at an OADM to receive and select an optical signal for the pre-validated path on an input port and an input wavelength. The block 22 shown in FIG. 8 may be coupled to a patch panel (not shown). For example, the patch panel, as part of the OADM, may operate to switch signals between different ports of the OADM, e.g., under control of processor 602. Thus, the OADM, including the OXC 30 and patch panel, may switch the received optical signal from the input port and wavelength to an associated output port and output wavelength or channel. The input and output wavelengths/channels may be the same or may be different at an OADM. This is merely an example, and other examples or implementations of an optical node may be used. Some examples of an optical node are described in US Published application US2009/0034978, as an example.

Figure 9:
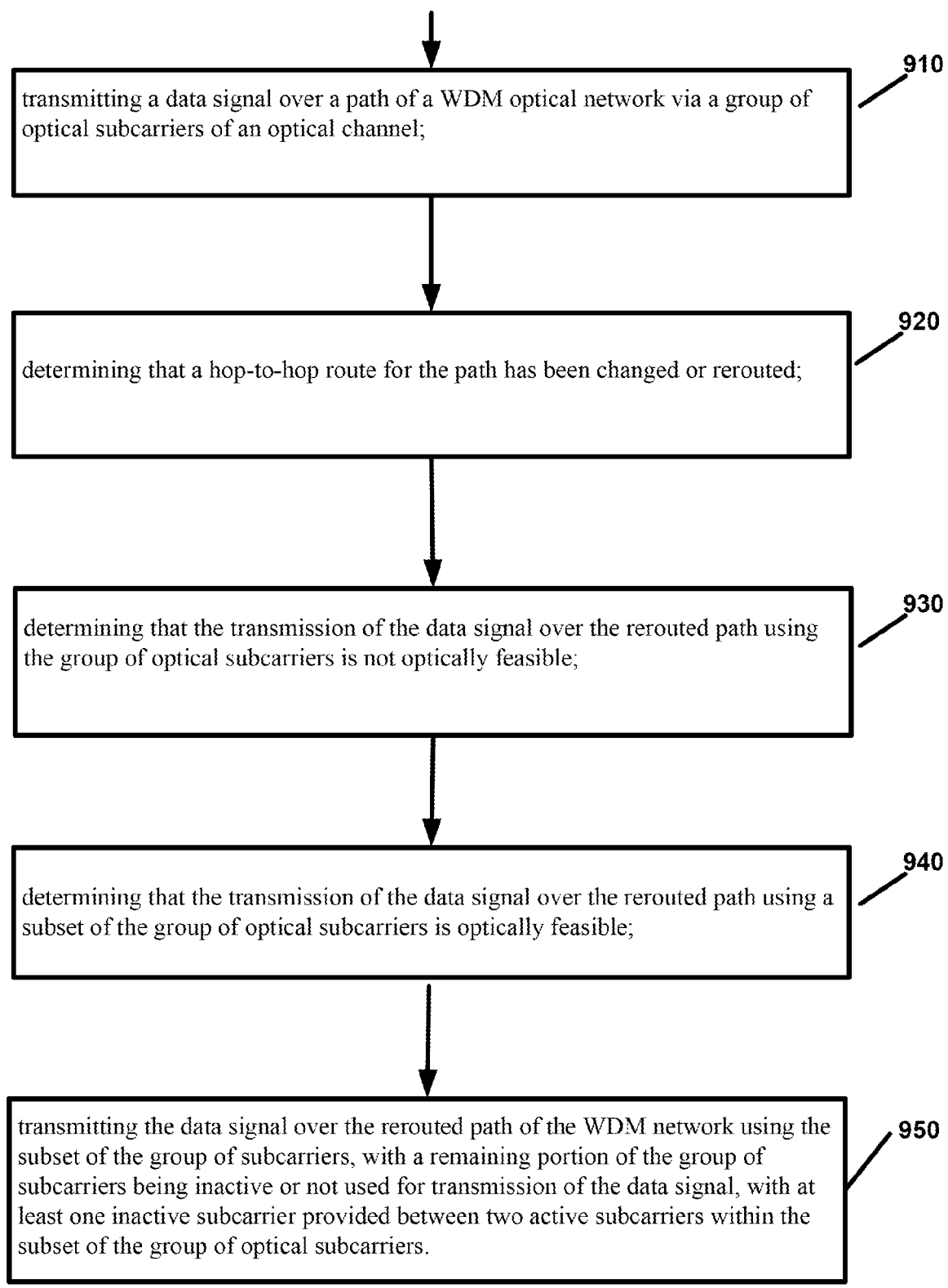
FIG. 9 is a flow chart illustrating operation of an optical node in an optical network according to an example embodiment.

FIG. 9 is a flow chart illustrating operation of an optical node in an optical network according to an example embodiment. Operation 910 may include transmitting a data signal over a path of a WDM optical network via a group of optical subcarriers of an optical channel. Operation 920 may include determining that a hop-to-hop route for the path has been changed or rerouted. Operation 930 may include determining that the transmission of the data signal over the rerouted path using the group of optical subcarriers is not optically feasible. Operation 940 may include determining that the transmission of the data signal over the rerouted path using a subset of the group of optical subcarriers is optically feasible. Operation 950 may include transmitting the data signal over the rerouted path of the WDM network using the subset of the group of subcarriers, with a remaining portion of the group of subcarriers being inactive or not used for transmission of the data signal, with at least one inactive subcarrier provided between two active subcarriers within the subset of the group of optical subcarriers.

Various alternatives for the method illustrated in FIG. 9 will be briefly described.

In the method of FIG. 9, the subset of optical subcarriers may provide a lower data rate or bandwidth for transmitting the data signal as compared to the group of optical subcarriers, the method further including sending, based on the lower data rate or lower bandwidth for the subset of optical subcarriers, a backpressure message (e.g., a flow control message) to an upstream node.

In an example embodiment, the determining (940) that the transmission of the data signal over the rerouted path using a subset of the group of optical subcarriers is optically feasible may include at least one of: performing, by either a central controller or via a distributed optical control plane, an optical feasibility calculation for the rerouted path and the subset of optical subcarriers; or determining that the rerouted path and the subset of the group of subcarriers matches a pre-validated path in a list of pre-validated paths, wherein each pre-validated path in the list of pre-validated paths was previously determined to be optically feasible.

The method of claim 1 wherein the determining (930) that the transmission of the data signal over the rerouted path using the group of optical subcarriers is not optically feasible may include: sending a message to request an optical feasibility calculation be performed via an optical control plane (OCP) controller provided at two or more of a plurality of nodes along the rerouted path of the WDM optical network; and receiving a reply message from one of the OCP controllers along the rerouted path of the WDM optical network indicating that the transmission of the data signal over the rerouted path using the group of optical subcarriers is not optically feasible.

In an example embodiment, the determining (940) that the transmission of the data signal over the rerouted path using the subset of the group of optical subcarriers is optically feasible may include: sending a message to request an optical feasibility calculation be performed in a distributed manner by an optical control plane (OCP) controller provided at two or more of a plurality of nodes along the rerouted path of the WDM optical network; and receiving a reply message from one of the OCP controllers along the rerouted path of the WDM optical network indicating that the transmission of the data signal over the rerouted path using the subset of the group of optical subcarriers is optically feasible.

In an example embodiment, the determining (930) that the transmission of the data signal over the rerouted path using the group of optical subcarriers is not optically feasible may include: comparing one or more parameters describing the rerouted path and the group of optical subcarriers to a list of pre-validated paths for the WDM optical network, each pre-validated path identifying an optically feasible label switched path in the WDM network; and determining that there is not a pre-validated path on the list that matches the rerouted path and the group of optical subcarriers.

The method of claim 1 wherein the determining (940) that the transmission of the data signal over the rerouted path using the subset of the group of optical subcarriers is optically feasible may include: comparing one or more parameters describing the rerouted path and the subset of the group of optical subcarriers to a list of pre-validated paths for the WDM optical network, each pre-validated path identifying an optically feasible label switched path in the WDM network; and determining that there is a pre-validated path on the list that matches the rerouted path and the subset of the group of optical subcarriers.

According to another example embodiment, an apparatus may include a transponder including a plurality of lasers including at least one laser for each of a plurality of subcarriers of a group of optical subcarriers; at least one processor; and at least one memory including computer program code, the computer program code, when executed by the processor, configured to cause the apparatus to: activate the plurality of lasers to transmit a data signal over a path of a WDM optical network via the group of optical subcarriers; determine that a hop-to-hop route for the path has been changed or rerouted; determine that the transmission of the data signal over the rerouted path using the group of optical subcarriers is not optically feasible; determine that the transmission of the data signal over the rerouted path using a subset of the group of optical subcarriers is optically feasible; and deactivate one or more of the plurality of lasers, to cause one or more of the subcarriers of the group of optical subcarriers to be inactive and allow the subset of the group of optical subcarriers to remain active, and to transmit the data signal over the rerouted path of the WDM network using the subset of the group of optical subcarriers via the activated lasers, with at least one inactive subcarrier provided between two active subcarriers within the subset.

In an example embodiment, the processor and computer code being configured to cause the apparatus to determine that the transmission of the data signal over the rerouted path using the subset of the group of optical subcarriers is optically feasible may include the processor and computer code being configured to cause the apparatus to: send a message to request an optical feasibility calculation be performed in a distributed manner by an optical control plane (OCP) controller provided at two or more of a plurality of nodes along the rerouted path of the WDM optical network; and receive a reply message from one of the OCP controllers along the rerouted path of the WDM optical network indicating that the transmission of the data signal over the rerouted path using the subset of the group of optical subcarriers is optically feasible.

In an example embodiment, wherein the processor and computer code being configured to cause the apparatus to determine that the transmission of the data signal over the rerouted path using the group of optical subcarriers is not optically feasible may include the processor and computer code being configured to cause the apparatus to: compare one or more parameters describing the rerouted path and the group of optical subcarriers to a list of pre-validated paths for the WDM optical network, each pre-validated path identifying an optically feasible label switched path in the WDM network; and determine that there is not a pre-validated path on the list that matches the rerouted path and the group of optical subcarriers.

In an example embodiment, the processor and computer code being configured to cause the apparatus to determine that the transmission of the data signal over the rerouted path using the subset of the group of optical subcarriers is optically feasible may include the processor and computer code being configured to cause the apparatus to: compare one or more parameters describing the rerouted path and the subset of the group of optical subcarriers to a list of pre-validated paths for the WDM optical network, each pre-validated path identifying an optically feasible label switched path in the WDM network; and determine that there is a pre-validated path on the list that matches the rerouted path and the subset of the group of optical subcarriers.

Figure 10:
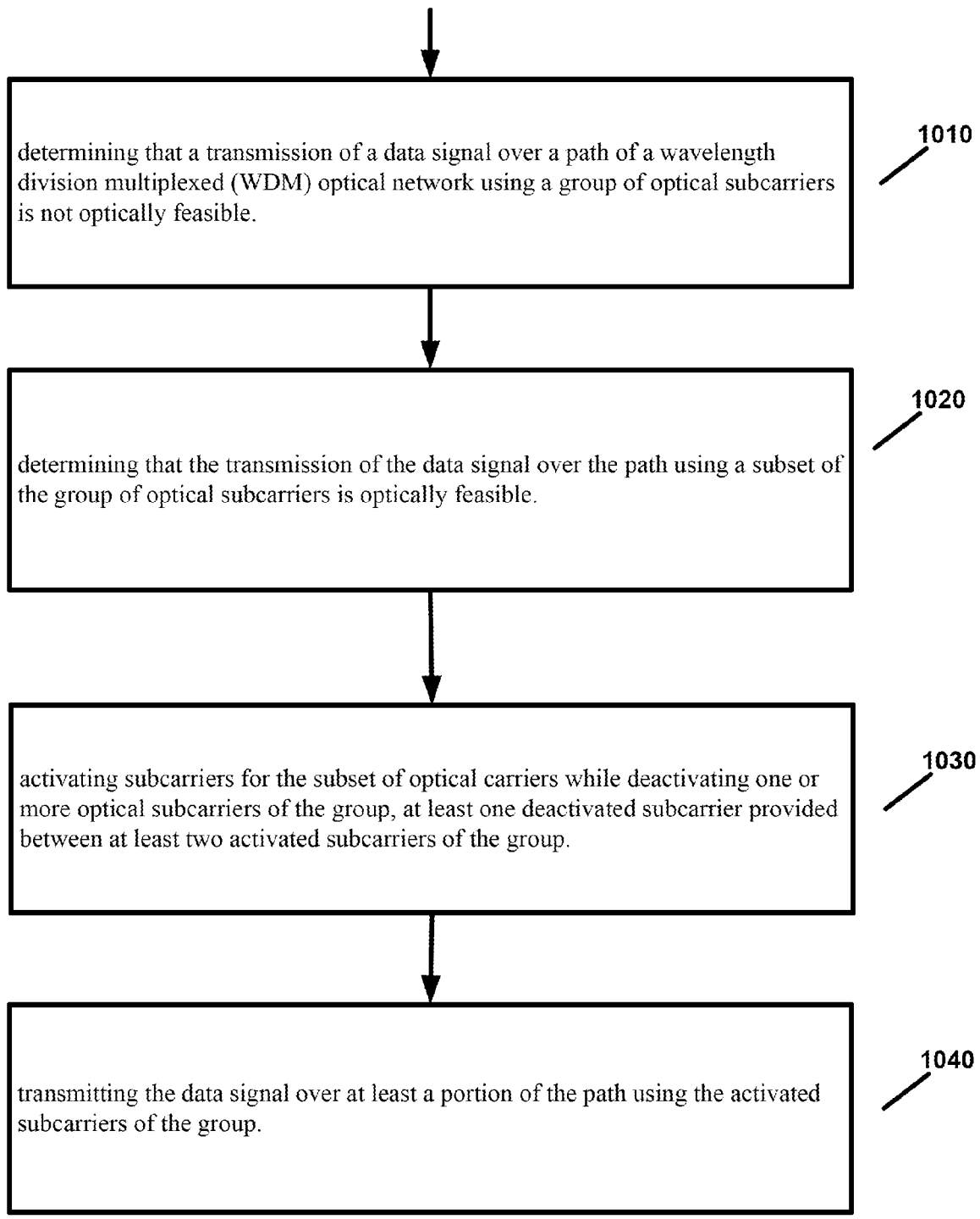
FIG. 10 is a flow chart illustrating operation of an optical node in an optical network according to another example embodiment.

FIG. 10 is a flow chart illustrating operation of an optical node in an optical network according to another example embodiment. Operation 1010 may include determining (e.g., by a processor 514, or via OCP control devices 126 of one or more nodes) that a transmission of a data signal over a path of a wavelength division multiplexed (WDM) optical network using a group of optical subcarriers is not optically feasible. Operation 1020 may include determining (e.g., by a processor 514 such as by performing a lookup into pre-validated path list 128, or via OCP control devices 126 of one or more nodes determining optical feasibility) that the transmission of the data signal over the path using a subset of the group of optical subcarriers is optically feasible. Operation 1030 may include activating (e.g., by processor 514 and/or lasers/modulators, FIG. 5) subcarriers for the subset of optical carriers while deactivating one or more optical subcarriers of the group, at least one deactivated subcarrier provided between at least two activated subcarriers of the group. Operation 1040 may include transmitting (e.g., by optical node, and/or by lasers/modulators, FIG. 5, for each active subcarriers) the data signal over at least a portion of the path using the activated subcarriers of the group.

The method of FIG. 10 may further include receiving, from a requesting node, a resource request to transmit the data signal via optical resources within the wavelength division multiplexed (WDM) optical network.

In an example embodiment of the method of FIG. 10, the resource request may identify an amount of requested resources, and wherein the activated subcarriers of the group provide less than the requested resources, the method may further include sending a flow control message to the requesting node to request a reduced data rate for the data signal or indicating that resources will be provided at a rate less than the resources requested.

In an example embodiment of the method of FIG. 10, a laser may be provided for each of the optical subcarriers of the group, the method further including activating a laser (e.g., see FIG. 5) for each of the activated (or active) subcarriers, and deactivating a laser for each of one or more deactivated (or inactive) optical subcarriers of the group.

In an example embodiment of the method of FIG. 10, wherein the determining operation 1010 is performed in response to detecting a change in a hop-to-hop route for the path.

In an example embodiment of the method of FIG. 10, the determining operation 1020 includes at least one of:

performing, by either a central controller or via a distributed optical control plane, an optical feasibility calculation for the path and the subset of optical subcarriers; or determining that the path and the subset of the group of subcarriers matches a pre-validated path in a list of pre-validated paths, wherein each pre-validated path in the list of pre-validated paths was previously determined to be optically feasible.

In an example embodiment of the method of FIG. 10, the determining operation 1020 includes:

sending a message to request an optical feasibility calculation be performed in a distributed manner by an optical control plane (OCP) controller provided at two or more of a plurality of nodes along the path of the WDM optical network; and receiving a reply message from one of the OCP controllers along the rerouted path of the WDM optical network indicating that the transmission of the data signal over the path using the subset of the group of optical subcarriers is optically feasible.

According to an example embodiment, an apparatus may include:

a plurality of lasers (e.g., see FIG. 5) including at least one laser for each of a plurality of subcarriers of a group of optical subcarriers;

at least one processor (e.g., 514); and at least one memory including computer program code, the computer program code, when executed by the processor, configured to cause the apparatus to:

determine that a transmission of a data signal over a path of a wavelength division multiplexed (WDM) optical network using a group of optical subcarriers is not optically feasible;

determine that the transmission of the data signal over the path using a subset of the group of optical subcarriers is optically feasible;

activate subcarriers for the subset of optical carriers while deactivating one or more optical subcarriers of the group, at least one deactivated subcarrier provided between at least two activated subcarriers of the group; and transmit the data signal over at least a portion of the path using the activated subcarriers of the group.

In an example embodiment, wherein the processor and computer program code configured to cause the apparatus to activate includes the processor and computer program code configured to cause the apparatus to activate the laser for each of the activated subcarriers; and wherein, the processor and computer program code configured to cause the apparatus to deactivate includes the processor and computer program code configured to cause the apparatus to deactivate the laser for each of one or more of the deactivated optical subcarriers of the group.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A method comprising:
  transmitting a data signal over a path of a wavelength-division multiplexed (WDM) optical network via an optical channel allocated as a group of optical subcarriers;
  determining that a hop-to-hop route for the path has been changed or rerouted;
  determining that the transmission of the data signal over the rerouted path using the group of optical subcarriers is not optically feasible;
  determining that the transmission of the data signal over the changed or rerouted path using a subset of optical subcarriers selected from the group of optical subcarriers is optically feasible;
  selecting the subset of optical subcarriers such that the data signal is carried in the optical channel in active subcarriers of the subset of optical subcarriers that are separated by at least one inactive subcarrier of the group of optical subcarriers; and
  transmitting the data signal in the optical channel over the changed or rerouted path of the WDM network using the active optical subcarriers of the subset of optical subcarriers.

2. The method of claim 1 and wherein the subset of optical subcarriers provides a lower data rate or bandwidth for transmitting the data signal as compared to the group of optical subcarriers, the method further comprising sending a message to an upstream node such that, in response to the message, the data rate or bandwidth of the data signal at the upstream node is reduced in accordance with the lower data rate or bandwidth.

3. The method of claim 1, wherein determining that the transmission of the data signal over the changed or rerouted path using a subset of the group of optical subcarriers is optically feasible comprises at least one of:

performing, either via a central controller or via a distributed optical control plane, an optical feasibility calculation for the changed or rerouted path and the subset of optical subcarriers; or determining that the changed or rerouted path and the subset of optical subcarriers matches a pre-validated path in a list of pre-validated paths, wherein each pre-validated path in the list of pre-validated paths was previously determined to be optically feasible.

4. The method of claim 1, wherein determining that the transmission of the data signal over the changed or rerouted path using the group of optical subcarriers is not optically feasible comprises:

sending a message to request that an optical feasibility calculation be performed via an optical control plane (OCP) controller provided at two or more of a plurality of nodes along the changed or rerouted path of the WDM optical network; and receiving a reply message from one of the OCP controllers along the changed or rerouted path of the WDM optical network indicating that the transmission of the data signal over the changed or rerouted path using the group of optical subcarriers is not optically feasible.

5. The method of claim 1, wherein determining that the transmission of the data signal over the changed or rerouted path using the subset of optical subcarriers is optically feasible comprises:

sending a message to request that an optical feasibility calculation be performed in a distributed manner by an optical control plane (OCP) controller provided at two or more of a plurality of nodes along the changed or rerouted path of the WDM optical network; and receiving a reply message from one of the OCP controllers along the changed or rerouted path of the WDM optical network indicating that the transmission of the data signal over the changed or rerouted path using the subset of optical subcarriers is optically feasible.

6. The method of claim 1, wherein determining that the transmission of the data signal over the changed or rerouted path using the group of optical subcarriers is not optically feasible comprises:

comparing one or more parameters describing the changed or rerouted path and the group of optical subcarriers to one or more parameters in a list of pre-validated paths for the WDM optical network, each pre-validated path identifying an optically feasible label switched path in the WDM network; and determining that there is not a pre-validated path on the list that matches the changed or rerouted path and the group of optical subcarriers.

7. The method of claim 1, wherein determining that the transmission of the data signal over the changed or rerouted path using the subset of optical subcarriers is optically feasible comprises:

comparing one or more parameters describing the changed or rerouted path and the subset of optical subcarriers to one or more parameters in a list of pre-validated paths for the WDM optical network, each pre-validated path identifying an optically feasible label switched path in the WDM network; and determining that there is a pre-validated path on the list that matches the changed or rerouted path and the subset of optical subcarriers.

8. An apparatus comprising:

a transponder including a plurality of lasers including at least one laser for each of a plurality of subcarriers of optical subcarriers;

at least one processor; and at least one memory including computer program code, the computer program code, when executed by the processor, configured to cause the apparatus to:

activate the plurality of lasers to transmit a data signal in an optical channel allocated as the group of optical subcarriers over a path of a wavelength-division multiplexed (WDM) optical network;

determine that a hop-to-hop route for the path has been changed or rerouted;

determine that the transmission of the data signal in the optical channel over the changed or rerouted path using the group of optical subcarriers is not optically feasible;

determine that the transmission of the data signal over the changed or rerouted path using a subset of optical carriers selected from the group of optical subcarriers is optically feasible; and deactivate one or more of the plurality of lasers to cause one or more of the subcarriers of the group of optical subcarriers to be inactive while allowing the subset of optical subcarriers to remain active; and transmit the data signal in the optical channel over the changed or rerouted path of the WDM network using the subset of optical subcarriers via the activated lasers such that at least one inactive subcarrier separates two active subcarriers within the subset of optical subcarriers.

9. The apparatus of claim 8, wherein processor and computer code being configured to cause the apparatus to determine that the transmission of the data signal over the changed or rerouted path using the subset of optical subcarriers is optically feasible comprises the processor and computer code being configured to cause the apparatus to:

send a message to request that an optical feasibility calculation be performed in a distributed manner by an optical control plane (OCP) controller provided at two or more of a plurality of nodes along the changed or rerouted path of the WDM optical network; and receive a reply message from one of the OCP controllers along the changed or rerouted path of the WDM optical network indicating that the transmission of the data signal over the changed or rerouted path using the subset of optical subcarriers is optically feasible.

10. The apparatus of claim 8, wherein processor and computer code being configured to cause the apparatus to determine that the transmission of the data signal over the rerouted path using the group of optical subcarriers is not optically feasible comprises the processor and computer code being configured to cause the apparatus to:

compare one or more parameters describing the changed or rerouted path and the group of optical subcarriers to one or more parameters in a list of pre-validated paths for the WDM optical network, each pre-validated path identifying an optically feasible label switched path in the WDM network; and determine that there is not a pre-validated path on the list that matches the changed or rerouted path and the group of optical subcarriers.

11. The apparatus of claim 8, wherein processor and computer code being configured to cause the apparatus to determine that the transmission of the data signal over the changed or rerouted path using the subset of optical subcarriers is optically feasible comprises the processor and computer code being configured to cause the apparatus to:

compare one or more parameters describing the changed or rerouted path and the subset of optical subcarriers to one or more parameters in a list of pre-validated paths for the WDM optical network, each pre-validated path identifying an optically feasible label switched path in the WDM network; and determine that there is a pre-validated path on the list that matches the changed or rerouted path and the subset of optical subcarriers.

12. An apparatus comprising:
at least one processor; and
at least one memory including computer program code, the computer program code, when executed by the processor, configured to cause the apparatus to:
allocate an optical channel in a wavelength-division multiplexed (WDM) optical network comprising a group of optical subcarriers;
activate a plurality of lasers, with at least one laser for each of a plurality of optical subcarriers of a group of optical subcarriers;
transmit a data signal in an optical channel comprising the group of optical subcarriers over a path of a wavelength-division multiplexed (WDM) optical network;
determine that a hop-to-hop route for the path has been changed or rerouted;
determine that the transmission of the data signal over the changed or rerouted path using the group of optical subcarriers is not optically feasible;
determine that the transmission of the data signal over the changed or rerouted path using a subset of optical subcarriers selected from the group of optical subcarriers is optically feasible;
deactivate one or more of the plurality of lasers to cause one or more of the subcarriers of the group of optical subcarriers to be inactive while allowing the subset of optical subcarriers to remain active; and
transmit the data signal in the optical channel over the rerouted path of the WDM network using the subset of optical subcarriers via the activated lasers such that at least one inactive subcarrier separates two active subcarriers within the subset of optical subcarriers.

13. A method comprising:
determining that a transmission of a data signal in an optical channel allocated as a group of optical subcarriers over a path of a wavelength division multiplexed (WDM) optical network is not optically feasible;
determining that the transmission of the data signal over the path using a subset of optical subcarriers selected from the group of optical subcarriers is optically feasible;
activating the subset of optical carriers subcarriers while deactivating one or more optical subcarriers of the group of optical subcarriers such that the data signal is carried in the optical channel via the subset of optical subcarriers in at least two activated subcarriers of the subset of optical subcarriers separated by at least one deactivated subcarrier of the group of optical subcarriers; and
transmitting the data signal in the optical channel over at least a portion of the path using the activated subcarriers of the subset of optical subcarriers.

14. The method of claim 13 and further comprising receiving, from a requesting node, a resource request to transmit the data signal within the WDM optical network via the optical channel allocated as the group of the optical subcarriers.

15. The method of claim 14, wherein resource request identifies requested resources for the optical channel so that the data signal can be conveyed therein, and wherein the activated subcarriers of the subset of optical subcarriers comprise less than the requested resources, the method further comprising sending a flow control message to the requesting node to request a reduced data rate for the data signal or indicating that resources will be provided at a rate less than the resources requested.

16. The method of claim 13, wherein a laser is provided for each of the optical subcarriers of the group, the method further comprising activating a laser for each of the activated optical subcarriers of the subset of optical subcarriers and deactivating a laser for each of one or more deactivated optical subcarriers of the group of optical subcarriers.

17. The method of claim 13, wherein determining that the transmission of the data signal over the path of the WDM optical network using the group of optical subcarriers is not optically feasible is performed in response to detecting a change in a hop-to-hop route for the path.

18. The method of claim 13, wherein determining that the transmission of the data signal over the path using the subset of optical subcarriers is optically feasible comprises at least one of:
performing, either via a central controller or via a distributed optical control plane, an optical feasibility calculation for the path and the subset of optical subcarriers; or
determining that the path and the subset of optical subcarriers matches a pre-validated path in a list of pre-validated paths, wherein each pre-validated path in the list of pre-validated paths was previously determined to be optically feasible.

19. The method of claim 13, wherein determining that the transmission of the data signal over the path using the subset of optical subcarriers is optically feasible comprises:
sending a message to request that an optical feasibility calculation be performed in a distributed manner by an optical control plane (OCP) controller provided at two or more of a plurality of nodes along the path of the WDM optical network; and
receiving a reply message from one of the OCP controllers along the rerouted path of the WDM optical network indicating that the transmission of the data signal over the path using the subset of optical subcarriers is optically feasible.

20. An apparatus comprising:
at least one processor; and
at least one memory including computer program code, the computer program code, when executed by the processor, configured to cause the apparatus to:
determine that a transmission of a data signal over a path of a wavelength division multiplexed (WDM) optical network in an optical channel comprising a group of optical subcarriers is not optically feasible;
determine that the transmission of the data signal over the path using a subset of optical subcarriers selected from the group of optical subcarriers is optically feasible;
activate the subset of optical subcarriers while deactivating one or more optical subcarriers of the group of optical subcarriers such that at least one deactivated subcarrier separates at least two activated subcarriers of the subset of optical subcarriers; and
transmit the data signal in the optical channel over at least a portion of the path using the activated subcarriers of the subset of optical subcarriers.

21. The apparatus of claim 20, wherein processor and computer program code configured to cause the apparatus to activate the subset of optical subcarriers comprises the processor and computer program code configured to cause the apparatus to activate a laser for each of the activated subcarriers; and
wherein, the processor and computer program code configured to cause the apparatus to deactivate subcarriers of the group comprises the processor and computer program code configured to cause the apparatus to deactivate a laser for each of one or more of the deactivated optical subcarriers of the group of optical subcarriers.

22. The apparatus of claim 20 and further comprising a plurality of lasers including at least one laser for each of a plurality of the subcarriers of the group of optical subcarriers, wherein the processor and computer program code configured to cause the apparatus to activate the subset of optical subcarriers comprises the processor and computer program code configured to cause the apparatus to activate the laser for each of the activated subcarriers of the subset of optical subcarriers; and wherein, the processor and computer program code configured to cause the apparatus to deactivate subcarriers of the group of optical subcarriers comprises the processor and computer program code configured to cause the apparatus to deactivate the laser for each of one or more of the deactivated optical subcarriers of the group of optical subcarriers.

\* \* \* \* \*